(12) United States Patent
Jiang et al.

(10) Patent No.: US 12,487,455 B2
(45) Date of Patent: Dec. 2, 2025

(54) AUGMENTED REALITY DEVICE AND EXPOSURE DEVICE

(71) Applicant: HANGZHOU HIKVISION DIGITAL TECHNOLOGY CO., LTD., Zhejiang (CN)

(72) Inventors: Li Jiang, Zhejiang (CN); Hong Cai, Zhejiang (CN); Chao Yu, Zhejiang (CN); Hui Mao, Zhejiang (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 971 days.

(21) Appl. No.: 17/615,052

(22) PCT Filed: May 22, 2020

(86) PCT No.: PCT/CN2020/091892
§ 371 (c)(1),
(2) Date: Nov. 29, 2021

(87) PCT Pub. No.: WO2020/238803
PCT Pub. Date: Dec. 3, 2020

(65) Prior Publication Data
US 2022/0179219 A1   Jun. 9, 2022

(30) Foreign Application Priority Data
May 27, 2019   (CN) .......................... 201910447393.3

(51) Int. Cl.
*G02B 27/01*   (2006.01)
*G02B 5/32*    (2006.01)

(52) U.S. Cl.
CPC .......... *G02B 27/0172* (2013.01); *G02B 5/32* (2013.01); *G02B 2027/0174* (2013.01)

(58) Field of Classification Search
CPC ..... G02B 27/00–648; G02B 2027/0105–0198; G02B 5/00–32
See application file for complete search history.

(56) References Cited

U.S. PATENT DOCUMENTS

| 3,807,829 A | 4/1974 | Close |
| 9,841,731 B2 | 12/2017 | Utsugi et al. |

(Continued)

FOREIGN PATENT DOCUMENTS

| CN | 1577182 | 2/2005 |
| CN | 1886785 A | 12/2006 |

(Continued)

OTHER PUBLICATIONS

Office Action issued in Corresponding Chinese Application No. 202210015999.1, dated March 27, 2023 (English Translation provided).

(Continued)

*Primary Examiner* — Christopher A Lamb, II
(74) *Attorney, Agent, or Firm* — NORTON ROSE FULBRIGHT US LLP

(57) ABSTRACT

Provided is an augmented reality device. The augmented reality device includes a first projection assembly and a first display assembly. The first display assembly is disposed on a light exit side of the first projection assembly. The first projection assembly includes a first scanner, a first laser, and a first lens group. The first display assembly includes a first holographic diffraction grating and a first lens. An exposure device is also provided.

8 Claims, 13 Drawing Sheets

(56) References Cited

U.S. PATENT DOCUMENTS

| | | |
|---|---|---|
| 2006/0280095 A1 | 12/2006 | Tsukagoshi et al. |
| 2012/0206781 A1 | 8/2012 | Kihara et al. |
| 2014/0226193 A1 | 8/2014 | Sun |
| 2016/0033771 A1* | 2/2016 | Tremblay ............... G02B 26/10 359/851 |
| 2016/0252726 A1 | 9/2016 | Ishida |
| 2017/0255017 A1 | 9/2017 | Haseltine |
| 2017/0261751 A1 | 9/2017 | Noguchi et al. |

FOREIGN PATENT DOCUMENTS

| | | |
|---|---|---|
| CN | 101246260 A | 8/2008 |
| CN | 103728728 A | 4/2014 |
| CN | 203825374 | 9/2014 |
| CN | 105006239 | 10/2015 |
| CN | 105359212 | 2/2016 |
| CN | 105929536 | 9/2016 |
| CN | 106444332 | 2/2017 |
| CN | 108072877 A | 5/2018 |
| CN | 109143583 A | 1/2019 |
| CN | 109239726 | 1/2019 |
| CN | 109407313 A | 3/2019 |
| CN | 109633905 A | 4/2019 |
| EP | 3062139 | 8/2016 |
| JP | 2017125905 A | 7/2017 |
| WO | 2005052929 A1 | 6/2005 |
| WO | 2018085941 A1 | 5/2018 |

OTHER PUBLICATIONS

Extended European search report issued in Corresponding European application No. 20812531.0, dated Jul. 4, 2022.

Office Action issued in Corresponding Chinese application No. 201910447393.3, dated Aug. 22, 2022 (machine translation provided).

International search report of PCT application No. PCT/CN2020/091892 issued on Aug. 31, 2020.

First office action of Chinese application No. 201910447393.3 issued on Mar. 22, 2021.

Second office action of Chinese application No. 201910447393.3 issued on Oct. 12, 2021.

* cited by examiner

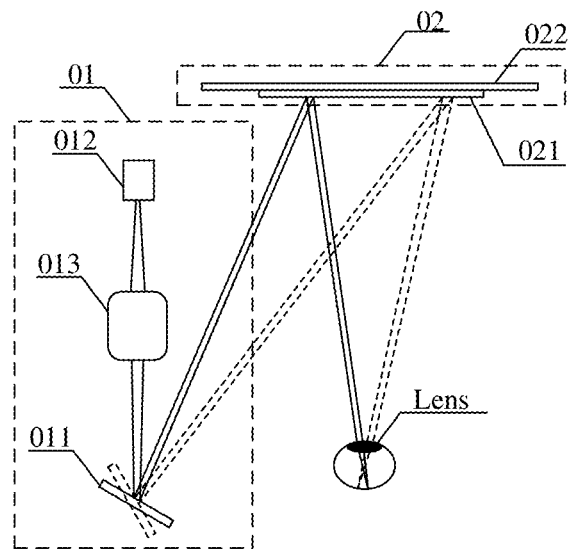
FIG. 1
| Pixel 1-1 | Pixel 1-2 | Pixel 1-3 | ...... | ...... | Pixel 1-n |
| Pixel 2-1 | Pixel 2-2 | Pixel 2-3 | ...... | ...... | Pixel 2-n |
| ...... | ...... | ...... | ...... | ...... | ...... |
| ...... | ...... | ...... | ...... | ...... | ...... |
| Pixel m-1 | Pixel m-2 | Pixel m-3 | ...... | ...... | Pixel m-n |
FIG. 2
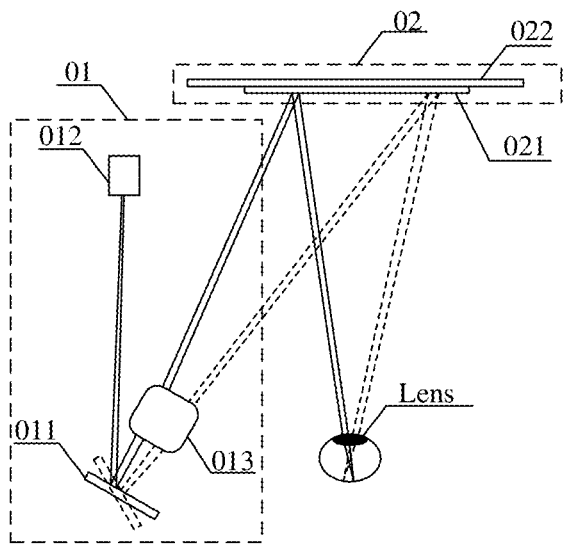
FIG. 3

AUGMENTED REALITY DEVICE AND EXPOSURE DEVICE

CROSS-REFERENCE TO RELATED APPLICATION

This application is a U.S. national stage of international application No. PCT/CN2020/091892, filed on May 22, 2020, which claims priority to Chinese Patent Application No. 201910447393.3, filed on May 27, 2019 and entitled "AUGMENTED REALITY DEVICE AND EXPOSURE DEVICE." Both applications are incorporated herein by reference in their entireties.

TECHNICAL FIELD

The present disclosure relates to the field of vision technologies, and in particular, relates to an augmented reality (AR) device and an exposure device.

BACKGROUND

Holography is a technology for recording and reproducing three-dimensional images in accordance with laser interference and diffraction principles. An AR device superimposes a reproduced three-dimensional image over a real world scene by the holography, such that the reproduced three-dimensional image and the real scene are simultaneously perceived by human eyes. In other words, the reproduced three-dimensional image and the real scene are simultaneously imaged on retinas of the human eyes.

SUMMARY

Embodiments of the present disclosure provide an AR device and an exposure device.

According to a first aspect, an AR device is provided. The AR device includes a first projection assembly and a first display assembly. The first display assembly is disposed on a light exit side of the first projection assembly.

The first projection assembly includes a first scanner, a first laser, and a first lens group. The first scanner is disposed on a light exit side of the first laser. The first lens group is disposed on a light incident side and/or a light exit side of the first scanner.

The first display assembly includes a first holographic diffraction grating and a first lens. The first holographic diffraction grating is disposed on the first lens. The first lens group includes at least one first spherical lens and/or at least one first aspheric lens.

Optionally, the first projection assembly further includes a second lens group.

In the case that the first lens group is disposed on the light incident side of the first scanner, the second lens group is disposed on the light exit side of the first scanner or between the first lens group and the first scanner. The second lens group includes at least one second spherical lens and/or at least one second aspheric lens.

In the case that the first lens group is disposed on the light exit side of the first scanner, the second lens group is disposed on a light exit side of the first lens group.

Optionally, a distance between a center of the first scanner and a center of the first holographic diffraction grating is a first distance, a light incidence angle of the first holographic diffraction grating is a first angle, and a distance between the center of the first holographic diffraction grating and a first focus is a second distance, wherein the first focus is a convergence point to which a laser beam corresponding to each pixel and incident on the first holographic diffraction grating is reflected.

Optionally, the AR device further includes a second projection assembly and a second display assembly. The second display assembly is disposed on a light exit side of the second projection assembly.

The second projection assembly includes a second scanner, a second laser, and a third lens group. The second scanner is disposed on a light exit side of the second laser. The third lens group is disposed on a light incident side and/or a light exit side of the second scanner.

The second display assembly includes a second holographic diffraction grating and a second lens. The second holographic diffraction grating is disposed on the second lens. The third lens group includes at least one first spherical lens and/or at least one first aspheric lens.

Optionally, the second projection assembly further includes a fourth lens group.

In the case that the third lens group is disposed on the light incident side of the second scanner, the fourth lens group is disposed on the light exit side of the second scanner or between the third lens group and the second scanner. The fourth lens group includes at least one second spherical lens and/or at least one second aspheric lens.

In the case that the third lens group is disposed on the light exit side of the second scanner, the fourth lens group is disposed on a light exit side of the third lens group.

Optionally, a distance between a center of the second scanner and a center of the second holographic diffraction grating is the first distance, a light incidence angle of the second holographic diffraction grating is the first angle, and a distance between the center of the second holographic diffraction grating and a second focus is the second distance, wherein the second focus is a convergence point to which a laser beam corresponding to each pixel and incident on the second holographic diffraction grating is reflected.

Optionally, the first projection assembly and the second projection assembly are symmetrically distributed, and the first display assembly and the second display assembly are symmetrically distributed. The first projection assembly and the first display assembly are disposed on one side of a center of symmetry, and the second projection assembly and the second display assembly are disposed on the other side of the center of symmetry.

Optionally, the AR device further includes a fixing assembly. The first projection assembly and the first display assembly are fixed on the fixing assembly.

Optionally, the AR device is AR glasses or an AR helmet.

According to a second aspect, an exposure device is provided. The exposure device includes a first polarization beam splitter, a third laser, a first exposure assembly, a second exposure assembly, and a holographic diffraction substrate.

The first polarization beam splitter is disposed on a light exit side of the third laser. The first polarization beam splitter is configured to transmit P-polarized light and reflect S-polarized light.

The first exposure assembly is disposed on a first light exit side of the first polarization beam splitter. The second exposure assembly is disposed on a second light exit side of the first polarization beam splitter. The holographic diffraction substrate is disposed in an overlapping area of light exit sides of the first exposure assembly and the second exposure assembly. A first surface of the holographic diffraction substrate is coated with a photosensitive film. The first light exit side of the first polarization beam splitter is a light exit side of the S-polarized light reflected by the first polarization beam splitter. The second light exit side of the first polarization beam splitter is a light exit side of the P-polarized light transmitted by the first polarization beam splitter.

Optionally, the first exposure assembly includes a reflector and a first objective lens.

The reflector is disposed on the first light exit side of the first polarization beam splitter. The first objective lens is disposed on a light exit side of the reflector. The reflector is configured to reflect the S-polarized light reflected by the first polarization beam splitter to the first objective lens. The first objective lens is configured to cause the S-polarized light reflected by the first polarization beam splitter to be incident on the first surface of the holographic diffraction substrate.

Optionally, a distance between a focus R of the first objective lens and a center of the first surface of the holographic diffraction substrate is a first distance. An angle between an optical axis of the first objective lens and the center of the first surface of the holographic diffraction substrate is a first angle.

Optionally, the second exposure assembly includes a first half-wave plate, a second polarization beam splitter, and a fifth lens group.

The first half-wave plate is disposed on the second light exit side of the first polarization beam splitter. The second polarization beam splitter is disposed on a light exit side of the first half-wave plate. The fifth lens group is disposed on a first light exit side of the second polarization beam splitter. The second polarization beam splitter is configured to transmit P-polarized light and reflect S-polarized light. The first light exit side of the second polarization beam splitter is a light exit side of the S-polarized light reflected by the second polarization beam splitter. The fifth lens group is configured to cause the polarized light reflected by the second polarization beam splitter to be incident on the first surface of the holographic diffraction substrate. A focus of the fifth lens group and the first surface of the holographic diffraction substrate are located on a same side of the holographic diffraction substrate.

Optionally, a distance between the focus of the fifth lens group and the center of the first surface of the holographic diffraction substrate is a second distance.

Optionally, the fifth lens group includes a second objective lens, a first lens, and a second lens.

The second objective lens is disposed on the first light exit side of the second polarization beam splitter. The first lens and the second lens are sequentially disposed on a light exit side of the second objective lens.

Optionally, the first exposure assembly further includes a second half-wave plate, a third polarization beam splitter, and a third half-wave plate.

The second half-wave plate is disposed on the first light exit side of the first polarization beam splitter. The third polarization beam splitter is disposed on a light exit side of the second half-wave plate. The third half-wave plate is disposed between a first light exit side of the third polarization beam splitter and the reflector. The third polarization beam splitter is configured to transmit P-polarized light and reflect S-polarized light. The first light exit side of the third polarization beam splitter is a light exit side of the P-polarized light transmitted by the third polarization beam splitter.

Optionally, the exposure device further includes a diaphragm. The diaphragm is in contact with a second surface of the holographic diffraction substrate. The diaphragm is configured to adjust an exposure area of the first surface of the holographic diffraction substrate.

Optionally, the exposure device further includes a moving assembly.

The moving assembly includes a first turntable and a second turntable. The second turntable is disposed on a first surface of the first turntable. The reflector is fixed on a first surface of the second turntable. A reflective surface of the reflector is perpendicular to the first surface of the second turntable. The first objective lens is fixed on the first surface of the first turntable. The first turntable and the second turntable may rotate around their own axes. An area of the first turntable is greater than an area of the second turntable.

Optionally, a third straight line is perpendicular to the first surface of the first turntable and the first surface of the second turntable, wherein the third straight line is a straight line on which centers of the first turntable and the second turntable are located.

Optionally, at least one pulley is mounted on a second surface of the first turntable, and the moving assembly further includes a rail.

The at least one pulley is disposed in the rail.

Optionally, the exposure device further includes an objective lens housing. The first objective lens is disposed in the objective lens housing. The objective lens housing is fixed on the first surface of the first turntable. The first objective lens is movable along its own optical axis in the objective lens housing.

Optionally, the holographic diffraction substrate is a single-layer diffraction substrate or a multi-layer diffraction substrate.

BRIEF DESCRIPTION OF THE DRAWINGS

To illustrate the technical solutions in the embodiments of the present disclosure more clearly, accompanying drawings required for illustrating the embodiments are introduced briefly hereinafter. Apparently, the accompanying drawings in the following illustration show merely some embodiments of the present disclosure. Those of ordinary skill in the art may derive other drawings from these accompanying drawings without creative efforts.

FIG. 1 is a schematic structural diagram of a first AR device according to an embodiment of the present disclosure;

FIG. 2 is a schematic diagram of an image according to an embodiment of the present disclosure;

FIG. 3 is a schematic structural diagram of a second AR device according to an embodiment of the present disclosure;

REFERENCE NUMERALS

Figure 4:
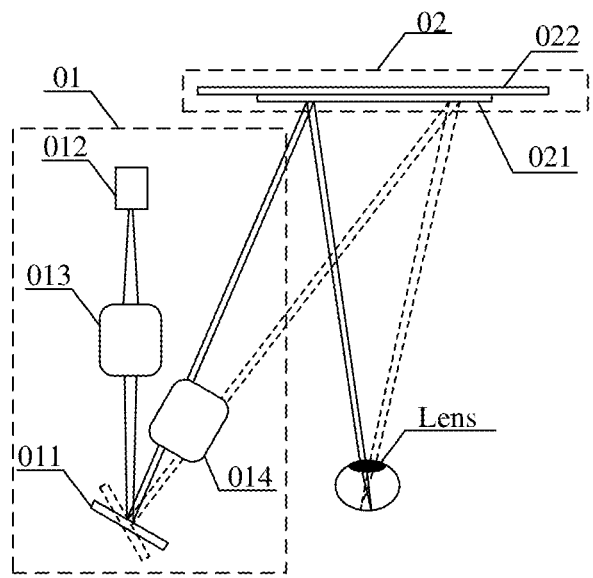
FIG. 4 is a schematic structural diagram of a third AR device according to an embodiment of the present disclosure.

01—first projection assembly, 02—first display assembly, 03—second projection assembly, 04—second display assembly, 05—fixing assembly, 06—first polarization beam splitter, 07—third laser, 08—first exposure assembly, 09—second exposure assembly, 10—holographic diffraction substrate, 11—diaphragm, 12—moving assembly, 13—objective lens housing, 14—rotating shaft, 15—support member;

011—first scanner, 012—first laser, 013—first lens group, 014—second lens group, 021—first holographic diffraction grating, 022—first lens, 031—second scanner, 032—second laser, 033—third lens group, 034—fourth lens group, 041—second holographic diffraction grating, 042—second lens, 061—first light exit side of the first polarization beam splitter, 062—second light exit side of the first polarization beam splitter, 081—reflector, 082—first objective lens, 083—second half-wave plate, 084—third polarization beam splitter, 085—third half-wave plate, 091—first half-wave plate, 092—second polarization beam splitter, 093—fifth lens group, 101—first surface of the holographic diffraction substrate, 102—second surface of the holographic diffraction substrate, 121—first turntable, 122—second turntable, 123—rail;

0921—first light exit side of the second polarization beam splitter, 0931—second objective lens, 0932—first lens, 0933—second lens.

DETAILED DESCRIPTION

The embodiments are described in detail hereinafter and shown in the accompanying drawings. In the following descriptions related to the accompanying drawings, unless otherwise specified, the same numeral in different accompanying drawings denotes the same or similar element. The examples described in the embodiments do not denote all examples consistent with the present disclosure. On the contrary, these examples are merely embodiments of an apparatus and a method consistent with some aspects of the present disclosure.

At present, the AR device mainly includes a projection assembly and a display assembly. The projection assembly mainly includes a laser and a scanner. The laser may project an image onto the scanner in a form of laser light. The scanner may reflect the laser light to a holographic diffraction grating in the display assembly. The holographic diffraction grating then reflects the laser light to the human eyes, and the laser light is imaged on the retinas of the human eyes, such that the human eyes may perceive the reproduced three-dimensional image. Each pixel in the image corresponds to one laser beam. The smaller a spot diameter of each laser beam reflected by the holographic diffraction grating to the human eyes, the higher a resolution of the reproduced three-dimensional image. Therefore, a light field control device may be configured between the projection assembly and the display assembly to reduce the spot diameter of each laser beam reflected to the human eyes, and hence to improve the resolution of the reproduced three-dimensional image. The light field control device is usually divided into a plurality of grids. Each grid corresponds to one pixel in the image. The grids may reduce the spot diameter of an incident laser beam to improve the resolution of the reproduced three-dimensional image.

However, because the light field control device needs to be structurally designed based on pixels in the projected image, the light field control device is complex and thus is difficult to manufacture.

FIG. 1 is a schematic structural diagram of an AR device according to an embodiment of the present disclosure. As shown in FIG. 1, the AR device includes a first projection assembly 01 and a first display assembly 02. The first display assembly 02 is disposed on a light exit side of the first projection assembly 01. The first projection assembly 01 includes a first scanner 011, a first laser 012, and a first lens group 013. The first scanner 011 is disposed on a light exit side of the first laser 012. The first lens group 013 is disposed on a light incident side and/or a light exit side of the first scanner 011. The first display assembly 02 includes a first holographic diffraction grating 021 and a first lens 022. The first holographic diffraction grating 021 is disposed on the first lens 022.

It should be noted that the first laser 012 may project an image in a form of a laser. The laser projected by the first laser 012 may include at least one of red light, green light, and blue light. Each laser beam in the projected laser corresponds to a pixel of an image. A color value of each pixel may be determined by adjusting an intensity ratio of light included in a laser beam corresponding to each pixel.

In addition, the first scanner 011 is configured to reflect the laser projected on the first scanner 011 to the first holographic diffraction grating 021. Generally, the first laser 012 may project a laser beam corresponding to only one pixel at a time. Therefore, the first scanner 011 may reflect a laser beam corresponding to only one pixel to the first holographic diffraction grating 021 at a time. To reflect all pixels of the image to the first holographic diffraction grating 021, the first scanner 011 may reflect laser beams corresponding to all pixels of the image to the first holographic diffraction grating 021 one by one through rotating mechanical movement. For example, referring to FIG. 2, the image includes m×n pixels. The first laser 012 may first project a laser beam corresponding to a pixel 1-1 in a first row and a first column of the image, and the first scanner 011 reflects the laser beam corresponding to the pixel 1-1 to the first holographic diffraction grating 021. Then the first laser 012 projects a laser beam corresponding to a pixel 1-2 in the first row and a second column of the image, and the first scanner 011 reflects the laser beam corresponding to the pixel 1-2 to the first holographic diffraction grating 021, and so on. Until laser beams corresponding to pixels in the first row are all reflected to the first holographic diffraction grating 021, laser beams corresponding to pixels in a second row, a third row, ..., and an $m^{th}$ row are reflected to the first holographic diffraction grating 021 in a same way to reflect the laser beams corresponding to all pixels of the image to the first holographic diffraction grating 021. The first scanner 011 may be a micro-electro-mechanical-systems (MEMS) scanning mirror, which is not limited in the embodiments of the present disclosure.

The first lens group 013 may reduce a spot diameter and divergence angle of a laser beam corresponding to each pixel and reflected from the first holographic diffraction grating 021, such that the reflected laser beam corresponding to each pixel is more proximal to a collimated beam, namely, a parallel beam.

Generally, the first scanner 011 and the first holographic diffraction grating 021 do not change the spot diameter and divergence angle of the laser beam corresponding to each pixel during reflecting the laser beam. Therefore, regardless of whether the first lens group 013 is disposed on the light incident side or the light exit side of the first scanner 011, a laser beam corresponding to each pixel and incident on the first lens group 013 may be collimated and reduced, to reduce a spot diameter and divergence angle of the laser beam. That is, a spot diameter and divergence angle of a laser beam corresponding to each pixel and incident on the first holographic diffraction grating 021 is reduced, thereby reducing the spot diameter and divergence angle of the laser beam corresponding to each pixel and reflected from the first holographic diffraction grating 021. In this way, the laser beam corresponding to each pixel and reflected from the first holographic diffraction grating 021 is more proximal to the collimated beam.

It should be noted that as shown in FIG. 1, the first holographic diffraction grating 021 is configured to further reflect the laser beam reflected by the first scanner 011. Therefore, it may be determined that the first holographic diffraction grating 021 is disposed on a surface, facing towards the first scanner 011, of the first lens 022.

The first lens group 013 may include at least one first spherical lens and/or at least one first aspheric lens. Parameters such as a focal length and a size of the at least one first spherical lens and/or the at least one first aspheric lens may be set based on the spot diameter and divergence angle of the laser projected by the first laser 012, which are not limited in the embodiments of the present disclosure.

Because the first lens group 013 and the first scanner 011 may have three different positional relationships, the positional relationships between the first lens group 013 and the first scanner 011 are in detail based on the following three examples.

In a first example, referring to FIG. 1, the first lens group 013 is disposed on the light incident side of the first scanner 011. In this case, the first lens group 013 may reduce the spot diameter and divergence angle of the laser beam corresponding to each pixel and incident on the first scanner 011, to reduce the spot diameter and divergence angle of the laser beam corresponding to each pixel and incident on the first holographic diffraction grating 021, thereby reducing the spot diameter and divergence angle of the laser beam corresponding to each pixel and reflected from the first holographic diffraction grating 021. In this way, the laser beam corresponding to each pixel and reflected from the first holographic diffraction grating 021 is more proximal to the collimated beam.

In a second example, referring to FIG. 3, the first lens group 013 is disposed on the light exit side of the first scanner 011. In this case, the first lens group 013 may reduce the spot diameter and divergence angle of the laser beam corresponding to each pixel and reflected from the first scanner 011, to reduce the spot diameter and divergence angle of the laser beam corresponding to each pixel and incident on the first holographic diffraction grating 021, thereby reducing the spot diameter and divergence angle of the laser beam corresponding to each pixel and reflected from the first holographic diffraction grating 021. In this way, the laser beam corresponding to each pixel and reflected from the first holographic diffraction grating 021 is more proximal to the collimated beam.

In a third example, the first lens group 013 is disposed on the light incident side and the light exit side of the first scanner 011. That is, two first lens groups 013 are disposed on each of the light incident side and the light exit side of the first scanner 011. In this case, the first lens group 013 on the light incident side of the first scanner 011 may reduce the spot diameter and divergence angle of the laser beam corresponding to each pixel and incident on the first scanner 011, and the first lens group 013 on the light exit side of the first scanner 011 may reduce the spot diameter and divergence angle of the laser beam corresponding to each pixel and reflected from the first scanner 011, to further reduce the spot diameter and divergence angle of the laser beam corresponding to each pixel and incident on the first holographic diffraction grating 021, thereby reducing the spot diameter and divergence angle of the laser beam corresponding to each pixel and reflected from the first holographic diffraction grating 021. In this way, the laser beam corresponding to each pixel and reflected from the first holographic diffraction grating 021 is more proximal to the collimated beam.

It should be noted that the first holographic diffraction grating 021 is an optical element that records wavelength, amplitude, and phase information of laser through laser interference. The laser beam corresponding to each pixel and incident on the first holographic diffraction grating 021 may be reflected by the first holographic diffraction grating 021, and the reflected laser beams may be converged. For ease of description, a convergence position may be referred to as a first focus. That is, the first focus is a convergence point to which the laser beam corresponding to each pixel and incident on the first holographic diffraction grating 021 is reflected. In some embodiments, referring to FIG. 1 or FIG. 2, the laser beam corresponding to each pixel and reflected by the first holographic diffraction grating 021 may be converged on a lens of a user. That is, the lens of the user is located at the first focus. In this case, the reflected laser may be imaged on a retina of a human eye in response to being refracted by the lens, such that the human eyes are capable of perceiving a reproduced three-dimensional image.

In addition, the first lens 022 is an optical element configured to carry the first holographic diffraction grating 021. The first holographic diffraction grating 021 may be disposed on the first lens 022 through electrostatic adsorption or bonding. In the case that the lens of the user is located at the first focus, the user may not only perceive the reproduced three-dimensional image by using the first projection assembly 01 and the first display assembly 02, but also observe a real world scene by using the first lens 022 to implement AR.

Specifically, when the AR device is used, the first laser 012 may be first turned on, such that the first laser 012 projects each pixel of the image in the form of the laser. Then, the first scanner 011 reflects the laser beam corresponding to each pixel to the first holographic diffraction grating 021. Next, the first holographic diffraction grating 021 reflects the laser beam corresponding to each pixel to the lens of the user. In response to being refracted by the lens, the laser beam may be imaged on the retina of the user, such that the user may perceive the reproduced three-dimensional image. In addition, the user may also perceive the real scene by using the first lens 022 to implement AR.

Generally, the first lens group 013 may collimate and reduce the incident laser beam corresponding to each pixel to reduce a spot diameter and divergence angle of a laser beam transmitted from the first lens group 013. However, the divergence angle of the transmitted laser beam is usually not zero. Therefore, during the propagation of the laser beam transmitted from the first lens group 013 to the first holographic diffraction grating 021, the spot diameter increases with increase of an optical path. To further reduce the spot diameter and divergence angle of the laser beam corresponding to each pixel and reflected from the first holographic diffraction grating 021, the first projection assembly 01 may further include a second lens group 014.

It should be noted that the second lens group 014 may include at least one second spherical lens and/or at least one second aspheric lens. Parameters such as a focal length and a size of the at least one second spherical lens and/or the at least one second aspheric lens may be set based on the spot diameter and divergence angle of the laser projected by the first laser 012, which are not limited in the embodiments of the present disclosure. In addition, the first lens group 013 may be the same as or different from the second lens group 014, which is not limited in the embodiments of the present disclosure.

In the case that the first projection assembly 01 further includes the second lens group 014, relative positions of the first lens group 013 and the second lens group 014 in the first projection assembly 01 may be different. The relative positions of the first lens group 013 and the second lens group 014 are described based on the following four examples.

In a first example, referring to FIG. 4, in the case that the first lens group 013 is disposed on the light incident side of the first scanner 011, the second lens group 014 may be disposed on the light exit side of the first scanner 011. In this case, the first lens group 013 may reduce the spot diameter and divergence angle of the laser beam corresponding to each pixel and incident on the first scanner 011, and the second lens group 014 may further reduce the spot diameter and divergence angle of the laser beam corresponding to each pixel and incident on the first holographic diffraction grating 021, to reduce the spot diameter and divergence angle of the laser beam corresponding to each pixel and reflected from the first holographic diffraction grating 021. In this way, the laser beam corresponding to each pixel and reflected from the first holographic diffraction grating 021 is more proximal to the collimated beam. That is, the first lens group 013 and the second lens group 014 may collimate and reduce the laser beam corresponding to each pixel and incident on the first holographic diffraction grating 021 twice, such that the spot diameter and divergence angle of the laser beam corresponding to each pixel and reflected from the first holographic diffraction grating 021 are smaller and more proximal to those of the collimated beam.

Figure 5:
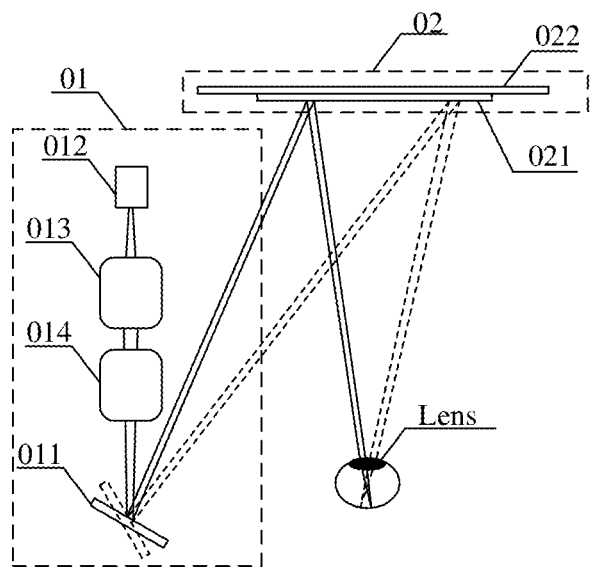
FIG. 5 is a schematic structural diagram of a fourth AR device according to an embodiment of the present disclosure.

In a second example, referring to FIG. 5, in the case that the first lens group 013 is disposed on the light incident side of the first scanner 011, the second lens group 014 is disposed between the first lens group 013 and the first scanner 011. In this case, the first lens group 013 may reduce a spot diameter and divergence angle of a laser beam corresponding to each pixel and incident on the second lens group 014, and the second lens group 014 may reduce the spot diameter and divergence angle of the laser beam corresponding to each pixel and incident on the first scanner 011, to reduce the spot diameter and divergence angle of the laser beam corresponding to each pixel and incident on the first holographic diffraction grating 021, thereby reducing the spot diameter and divergence angle of the laser beam corresponding to each pixel and reflected from the first holographic diffraction grating 021. That is, the first lens group 013 and the second lens group 014 may collimate and reduce the laser beam incident on the first holographic diffraction grating 021 twice, such that the spot diameter and divergence angle of the laser beam corresponding to each pixel and reflected from the first holographic diffraction grating 021 are smaller and more proximal to those of the collimated beam.

Figure 6:
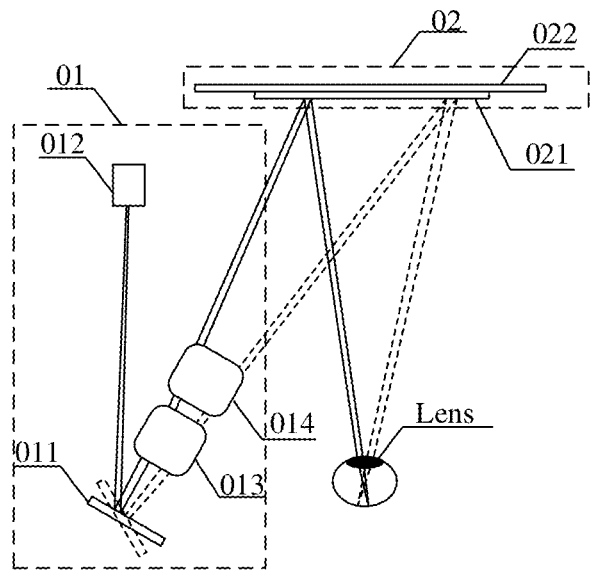
FIG. 6 is a schematic structural diagram of a fifth AR device according to an embodiment of the present disclosure.

In a third example, referring to FIG. 6, in the case that the first lens group 013 is disposed on the light exit side of the first scanner 011, the second lens group 014 may be disposed on a light exit side of the first lens group 013. In this case, the first lens group 013 may reduce a spot diameter and divergence angle of a laser beam corresponding to each pixel and incident on the second lens group 014, and the second lens group 014 may reduce the spot diameter and divergence angle of the laser beam corresponding to each pixel and incident on the first holographic diffraction grating 021. That is, the first lens group 013 and the second lens group 014 are capable of collimating and reducing the laser beam corresponding to each pixel and incident on the first holographic diffraction grating 021 twice, such that the spot diameter and divergence angle of the laser beam corresponding to each pixel and reflected from the first holographic diffraction grating 021 are smaller and more proximal to those of the collimated beam.

In a fourth example, in the case that the first lens groups 013 are disposed on each of the light incident side and the light exit side of the first scanner 011, the second lens group 014 may be disposed on a light exit side of any one of the two first lens groups 013.

The relative positions of the first lens group 013 and the second lens group 014 are described only based on the above four examples. In practice, the relative positions are not limited to the above four example, which are not limited in the embodiments of the present disclosure.

It should be noted that in practice, the first projection assembly 01 may further include other lens groups or the like. These lens groups may be disposed at a position such as the light incident side or the light exit side of the first scanner 011 based on requirements, to reduce the spot diameter and divergence angle of the laser beam corresponding to each pixel and reflected from the first holographic diffraction grating 021.

A distance between a center of the first scanner 011 and a center of the first holographic diffraction grating 021 may be a first distance. A light incidence angle of the first holographic diffraction grating 021 is a first angle. That is, an angle between a first straight line and a surface of the first holographic diffraction grating 021 is the first angle. The first straight line is a straight line on which the center of the first scanner 011 and the center of the first holographic diffraction grating 021 are located. In addition, a distance between the center of the first holographic diffraction grating 021 and the first focus may be a second distance.

Figure 7:
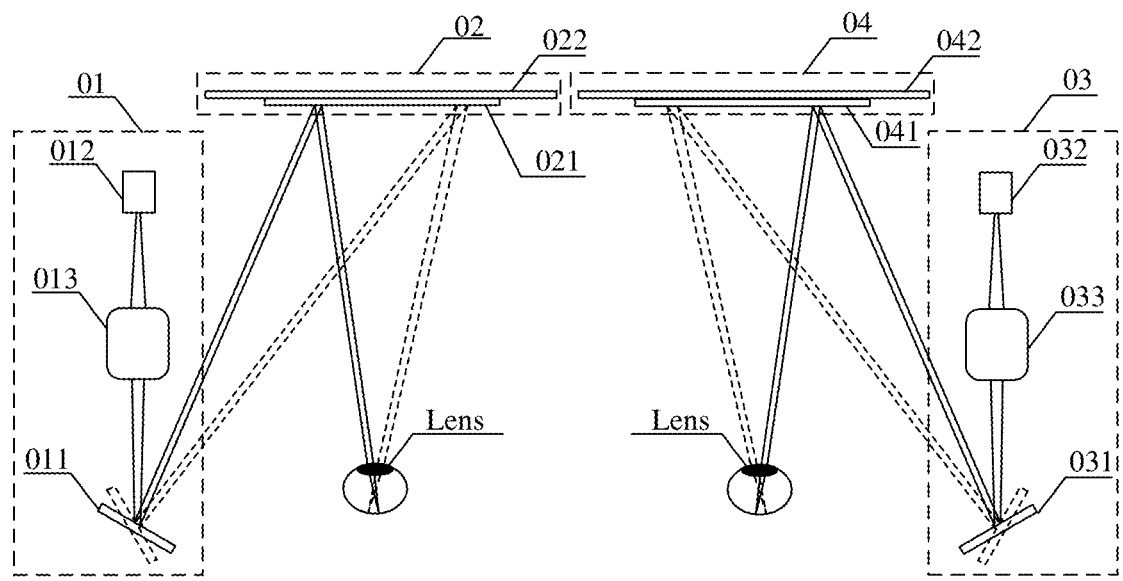
FIG. 7 is a schematic structural diagram of a sixth AR device according to an embodiment of the present disclosure.

Generally, when the user uses the AR device, for a better effect of the reproduced three-dimensional image perceived by the eyes, referring to FIG. 7, the AR device may further include a second projection assembly 03 and a second display assembly 04. The second display assembly 04 is disposed on a light exit side of the second projection assembly 03. The second projection assembly 03 includes a second scanner 031, a second laser 032, and a third lens group 033. The second scanner 031 is disposed on a light exit side of the second laser 032, and the third lens group 033 is disposed on a light incident side and/or a light exit side of the second scanner 031. The second display assembly 04 includes a second holographic diffraction grating 041 and a second lens 042. The second holographic diffraction grating 041 is disposed on the second lens 042. The third lens group 033 is configured to reduce a spot diameter and divergence angle of a laser beam incident on the second holographic diffraction grating 041.

It should be noted that as shown in FIG. 7, the second holographic diffraction grating 041 is configured to further reflect a laser beam reflected by the second scanner 031. Therefore, it may be determined that the second holographic diffraction grating 041 is disposed on a surface, facing towards the second scanner 031, of the second lens 042.

It should be noted that the second laser 032, the second scanner 031, the third lens group 033, the second holographic diffraction grating 041, and the second lens 042 are similar to the first laser 012, the first scanner 011, the first lens group 013, the first holographic diffraction grating 021, and the first lens 022, respectively. Details may be referred to the above descriptions of the first laser 012, the first scanner 011, the first lens group 013, the first holographic diffraction grating 021, and the first lens 022, which are not described herein. Because the third lens group 033 is similar to the first lens group 013, the third lens group 033 may include at least one first spherical lens and/or at least one first aspheric lens.

Generally, the third lens group 033 may collimate and reduce an incident laser beam corresponding to each pixel to reduce a spot diameter and divergence angle of a laser beam transmitted from the third lens group 033. However, the divergence angle of the transmitted laser beam is usually not zero. Therefore, during the propagation of the laser beam transmitted from the third lens group 033 to the second holographic diffraction grating 041, the spot diameter increases with increase of an optical path. To further reduce a spot diameter and divergence angle of a laser beam corresponding to each pixel and reflected from the second holographic diffraction grating 041, the second projection assembly 03 may further include a fourth lens group 034.

It should be noted that the fourth lens group 034 is similar to the second lens group 014, and the fourth lens group 034 may include at least one second spherical lens and/or at least one second aspheric lens. In addition, the third lens group 033 may be the same as or different from the fourth lens group 034, which is not limited in the embodiments of the present disclosure.

Similar to the relative positions of the first lens group 013 and the second lens group 014, relative positions of the third lens group 033 and the fourth lens group 034 in the second projection assembly 03 may be different. The relative positions of the third lens group 033 and the fourth lens group 034 are described based on the following four examples.

Figure 8:
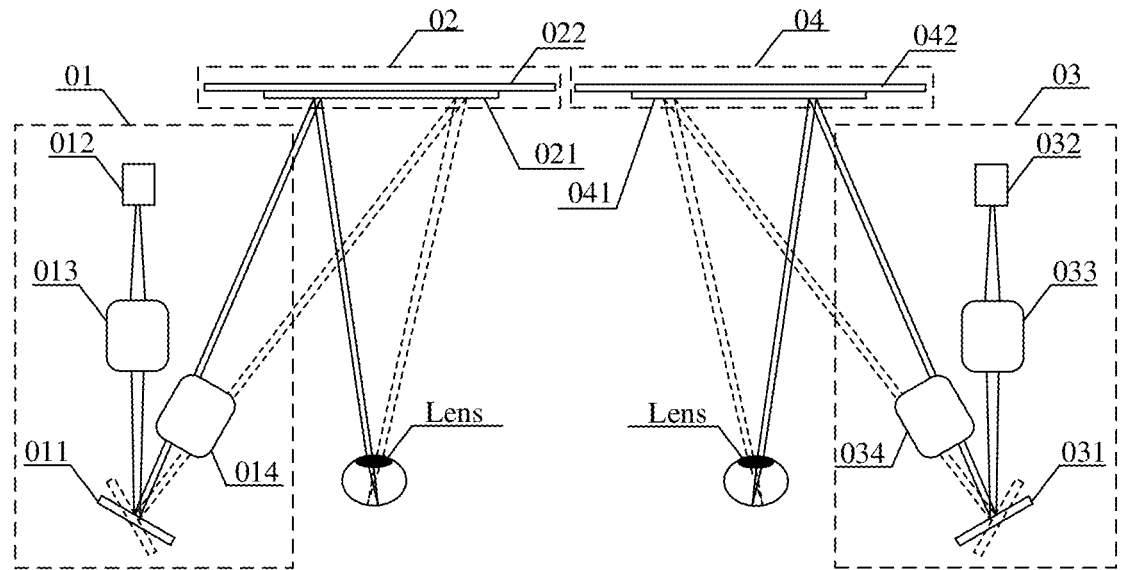
FIG. 8 is a schematic structural diagram of a seventh AR device according to an embodiment of the present disclosure.

In a first example, referring to FIG. 8, in the case that the third lens group 033 is disposed on the light incident side of the second scanner 031, the fourth lens group 034 may be disposed on the light exit side of the second scanner 031. In this case, the third lens group 033 may reduce a spot diameter and divergence angle of a laser beam corresponding to each pixel and incident on the second scanner 031, and the fourth lens group 034 may further reduce the spot diameter and divergence angle of the laser beam corresponding to each pixel and incident on the second holographic diffraction grating 041, to reduce the spot diameter and divergence angle of the laser beam corresponding to each pixel and reflected from the second holographic diffraction grating 041. In this way, the laser beam corresponding to each pixel and reflected from the second holographic diffraction grating 041 is more proximal to the collimated beam. That is, the third lens group 033 and the fourth lens group 034 may collimate and reduce the laser beam corresponding to each pixel and incident on the second holographic diffraction grating 041 twice, such that the spot diameter and divergence angle of the laser beam corresponding to each pixel and reflected from the second holographic diffraction grating 041 are smaller and more proximal to those of the collimated beam.

Figure 9:
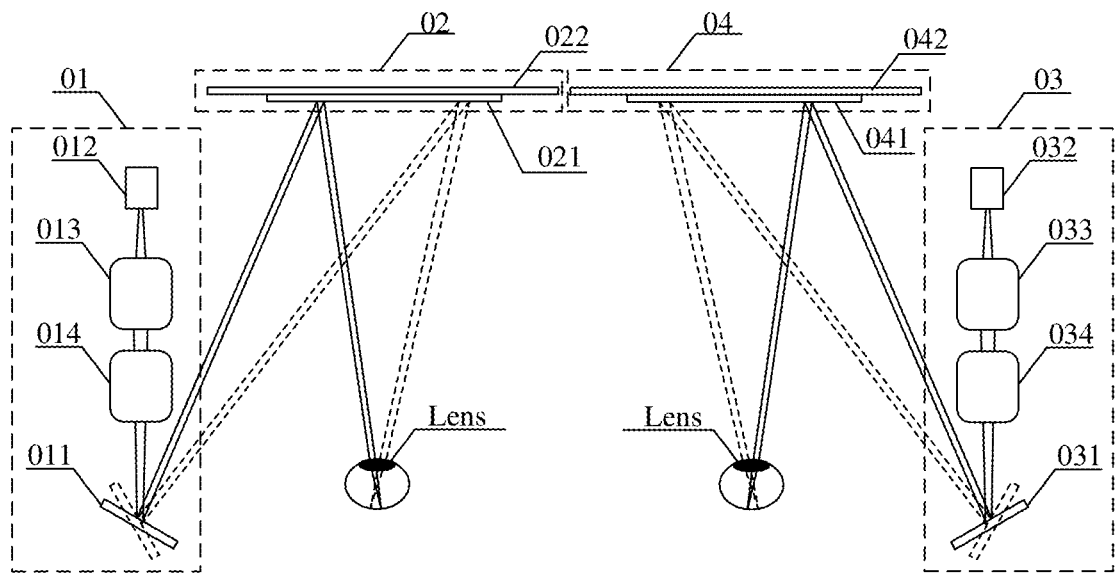
FIG. 9 is a schematic structural diagram of an eighth AR device according to an embodiment of the present disclosure.

In a second example, referring to FIG. 9, in the case that the third lens group 033 is disposed on the light incident side of the second scanner 031, the fourth lens group 034 is disposed between the third lens group 033 and the second scanner 031. In this case, the third lens group 033 may reduce a spot diameter and divergence angle of a laser beam corresponding to each pixel and incident on the fourth lens group 034, and the fourth lens group 034 may reduce a spot diameter and divergence angle of a laser beam corresponding to each pixel and incident on the second scanner 031, to reduce the spot diameter and divergence angle of the laser beam corresponding to each pixel and incident on the second holographic diffraction grating 041, thereby reducing the spot diameter and divergence angle of the laser beam corresponding to each pixel and reflected from the second holographic diffraction grating 041. That is, the third lens group 033 and the fourth lens group 034 may collimate and reduce the laser beam incident on the second holographic diffraction grating 041 twice, such that the spot diameter and divergence angle of the laser beam corresponding to each pixel and reflected from the second holographic diffraction grating 041 are smaller and more proximal to those of the collimated beam.

Figure 10:
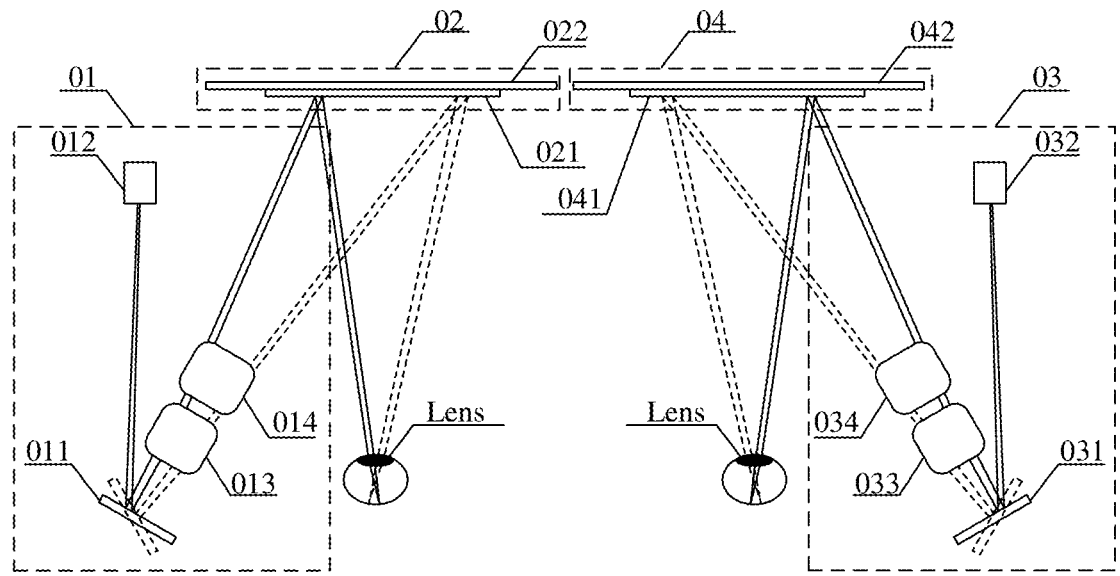
FIG. 10 is a schematic structural diagram of a ninth AR device according to an embodiment of the present disclosure.

In a third example, referring to FIG. 10, in the case that the third lens group 033 is disposed on the light exit side of the second scanner 031, the fourth lens group 034 may be disposed on a light exit side of the third lens group 033. In this case, the third lens group 033 may reduce a spot diameter and divergence angle of a laser beam corresponding to each pixel and incident on the fourth lens group 034, and the fourth lens group 034 may reduce the spot diameter and divergence angle of the laser beam corresponding to each pixel and incident on the second holographic diffraction grating 041. That is, the third lens group 033 and the fourth lens group 034 may collimate and reduce the laser beam corresponding to each pixel and incident on the second holographic diffraction grating 041 twice, such that the spot diameter and divergence angle of the laser beam corresponding to each pixel and reflected from the second holographic diffraction grating 041 are smaller and more proximal to those of the collimated beam.

In a fourth example, in the case that the third lens groups 033 are disposed on each of the light incident side and the light exit side of the second scanner 031, the fourth lens group 034 may be disposed on a light exit side of any one of the two third lens groups 033.

The relative positions of the third lens group 033 and the fourth lens group 034 are described only based on the above four examples. In practice, the relative positions are not limited to the above four examples, which are not limited in the embodiments of the present disclosure.

It should be noted that in practice, the second projection assembly 03 may further include other lens groups or the like. These lens groups may be disposed at a position such as the light incident side or the light exit side of the second scanner 031 based on requirements, to reduce the spot diameter and divergence angle of the laser beam incident on the second holographic diffraction grating 041.

A distance between a center of the second scanner 031 and a center of the second holographic diffraction grating 041 is the first distance. A light incidence angle of the second holographic diffraction grating 041 is the first angle. That is, an angle between a second straight line and a surface of the second holographic diffraction grating 041 is the first angle. The second straight line is a straight line on which the center of the second scanner 031 and that of the second holographic diffraction grating 041 are located. In addition, a distance between the center of the second holographic diffraction grating 041 and a second focus is the second distance, wherein the second focus is a convergence point to which the laser beam corresponding to each pixel and incident on the second holographic diffraction grating 041 is reflected. In some embodiments, the second focus may also be a position at which the lens of the user is located.

The first projection assembly 01 and the second projection assembly 03 may be symmetrically distributed. The first display assembly 02 and the second display assembly 04 may be symmetrically distributed. The first projection assembly 01 and the first display assembly 02 are disposed on one side of a center of symmetry, and the second projection assembly 03 and the second display assembly 04 are disposed on the other side of the center of symmetry. In the case that the first projection assembly 01 includes the first lens group 013 and the second projection assembly 03 includes the third lens group 033, the first lens group 013 and the third lens group 033 are symmetrically distributed. In the case that the first projection assembly 01 includes the first lens group 013 and the second lens group 014, and the second projection assembly 03 includes the third lens group 033 and the fourth lens group 034, the first lens group 013 and the third lens group 033 are symmetrically distributed, and the second lens group 014 and the fourth lens group 034 are symmetrically distributed. In some embodiments, the first lens group 013 and the third lens group 033 may be asymmetrically distributed, and/or the second lens group 014 and the fourth lens group 034 may be asymmetrically distributed, which are not limited in the embodiments of the present disclosure.

The AR device may be AR glasses or an AR helmet. A distance between the center of the first holographic diffraction grating 021 and the center of the second holographic diffraction grating 041 may be set based on the pupillary distance of the user.

Figure 11:
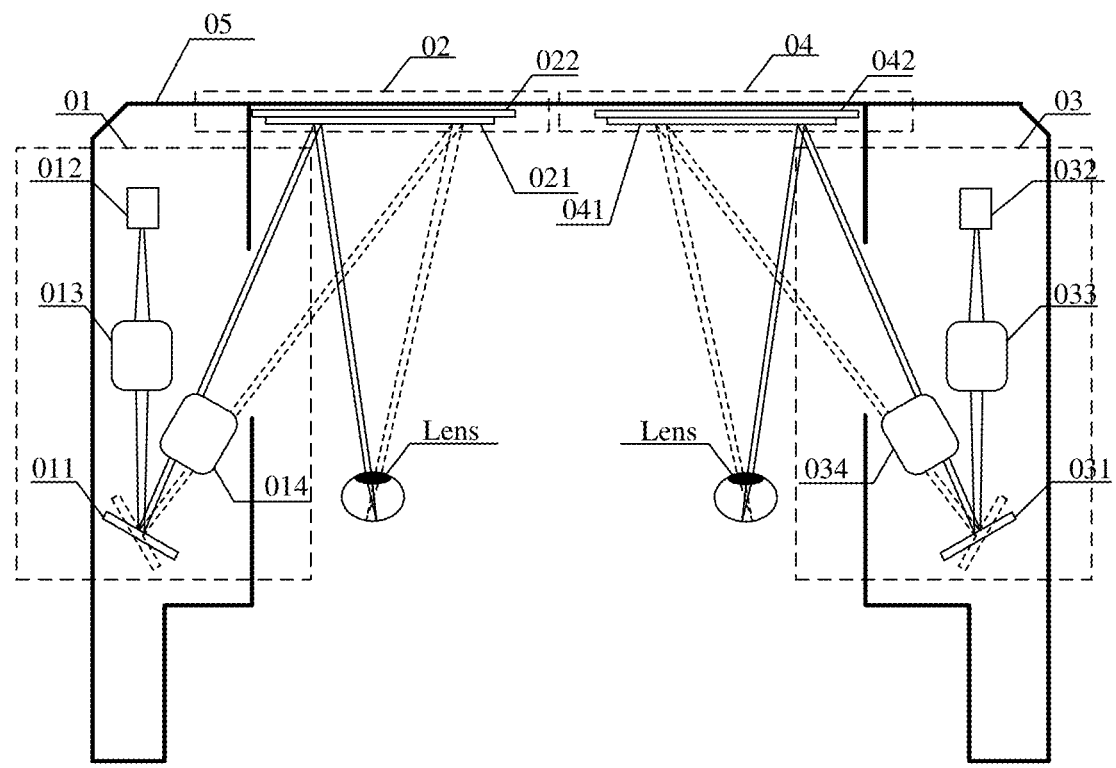
FIG. 11 is a schematic structural diagram of a tenth AR device according to an embodiment of the present disclosure.

Referring to FIG. 11, the AR device may further include a fixing assembly 05. The first projection assembly 01 and the first display assembly 02 are fixed on the fixing assembly 05. In the case that the AR device includes the second projection assembly 03 and the second display assembly 04, the second projection assembly 03 and the second display assembly 04 may also be fixed on the fixing assembly 05. In the case that the AR device is AR glasses, the fixing assembly 05 may be a frame of the glasses.

In the embodiments of the present disclosure, the AR device includes the first projection assembly 01 and the first display assembly 02. The first display assembly 02 is disposed on the light exit side of the first projection assembly 01. The first projection assembly 01 includes the first scanner 011, the first laser 012, and the first lens group 013. The first scanner 011 is disposed on the light exit side of the first laser 012. The first display assembly 02 includes the first holographic diffraction grating 021 and the first lens 022. The first holographic diffraction grating 021 is disposed on the first lens 022. Because the first lens group 013 may be disposed on the light incident side and/or the light exit side of the first scanner 011, the first lens group 013 may reduce the spot diameter and divergence angle of the laser beam corresponding to each pixel and incident on the first holographic diffraction grating 021, to reduce the spot diameter and divergence angle of the laser beam corresponding to each pixel and reflected from the first holographic diffraction grating 021, thereby improving a resolution of the reproduced three-dimensional image. The first lens group 013 provided in the present disclosure has a simple structure and is easy to manufacture, which facilitates manufacturing of the AR device.

An exposure device for preparing a holographic diffraction grating is described hereinafter. The holographic diffraction grating may be the first holographic diffraction grating 021 or the second holographic diffraction grating 041 in the AR device above.

Figure 12:
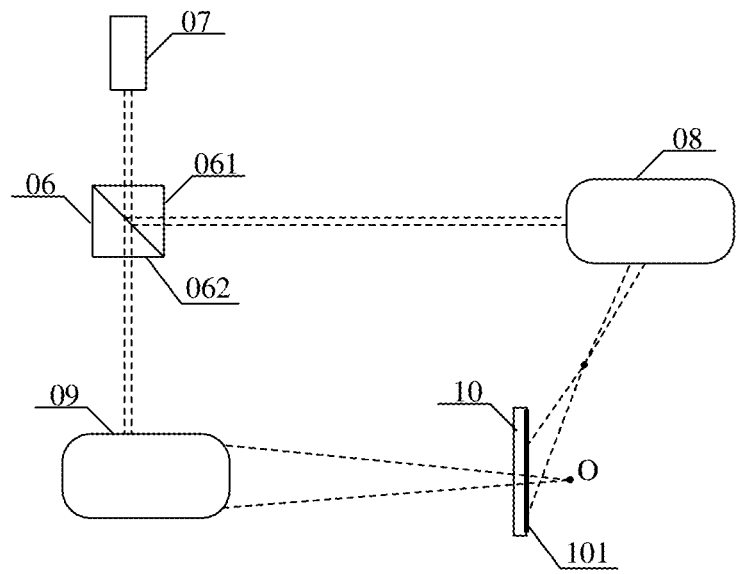
FIG. 12 is a schematic structural diagram of a first exposure device according to an embodiment of the present disclosure.

FIG. 12 is a schematic structural diagram of an exposure device according to an embodiment of the present disclosure. Referring to FIG. 12, the exposure device includes a first polarization beam splitter 06, a third laser 07, a first exposure assembly 08, a second exposure assembly 09, and a holographic diffraction substrate 10. The first polarization beam splitter 06 is disposed on a light exit side of the third laser 07. The first exposure assembly 08 is disposed on a first light exit side 061 of the first polarization beam splitter 06. The second exposure assembly 09 is disposed on a second light exit side 062 of the first polarization beam splitter 06. The holographic diffraction substrate 10 is disposed in an overlapping area of light exit sides of the first exposure assembly 08 and the second exposure assembly 09. A first surface 101 of the holographic diffraction substrate 10 is coated with a photosensitive film.

It should be noted that the third laser 07 is configured to project a laser to the first polarization beam splitter 06. In an example, a wavelength of the laser projected by the third laser 07 may be the same as a wavelength of the laser projected by the first laser 012, or the same as a wavelength of the laser projected by the second laser 032 in the above embodiments. The holographic diffraction substrate 10 may be a single-layer diffraction substrate or a multi-layer diffraction substrate. The first surface of the holographic diffraction substrate 10 may be a surface, facing towards the second exposure assembly 09, of the holographic diffraction substrate 10 or a surface, facing away from the second exposure assembly 09, of the holographic diffraction substrate 10, which is not limited in the embodiments of the present disclosure.

In addition, the first polarization beam splitter 06 is an optical element configured to transmit P-polarized light and reflect S-polarized light. The first light exit side 061 of the first polarization beam splitter 06 is a light exit side of the S-polarized light reflected by the first polarization beam splitter 06. The second light exit side 062 of the first polarization beam splitter 06 is a light exit side of the P-polarized light transmitted by the first polarization beam splitter 06. In the case that the third laser 07 projects the laser to the first polarization beam splitter 06, the first polarization beam splitter 06 may transmit P-polarized light in the laser and reflect S-polarized light in the laser.

The first exposure assembly 08 and the second exposure assembly 09 may simultaneously project S-polarized light onto the first surface 101 of the holographic diffraction substrate 10. In the case that the S-polarized light on different optical paths interfere on the first surface 101 of the holographic diffraction substrate 10, information such as a wavelength, an amplitude, and a phase of the laser projected by the third laser 07 may be recorded on the photosensitive film on the first surface 101 of the holographic diffraction substrate 10, to acquire a holographic diffraction grating. Alternatively, the first exposure assembly 08 and the second exposure assembly 09 may simultaneously project P-polarized light onto the first surface 101 of the holographic diffraction substrate 10. In the case that the P-polarized light on different optical paths interfere on the first surface 101 of the holographic diffraction substrate 10, information such as a wavelength, an amplitude, and a phase of the laser projected by the third laser 07 may be recorded on the photosensitive film on the first surface 101 of the holographic diffraction substrate 10, to acquire a holographic diffraction grating. That is, in the case that the first exposure assembly 08 and the second exposure assembly 09 simultaneously project a same type of polarized light onto the first surface 101 of the holographic diffraction substrate 10, interference may occur on the first surface 101 of the holographic diffraction substrate 10, to acquire a holographic diffraction grating. For ease of description, taking S-polarized light being projected onto the first surface 101 of the holographic diffraction substrate 10 as an example for description.

Figure 13:
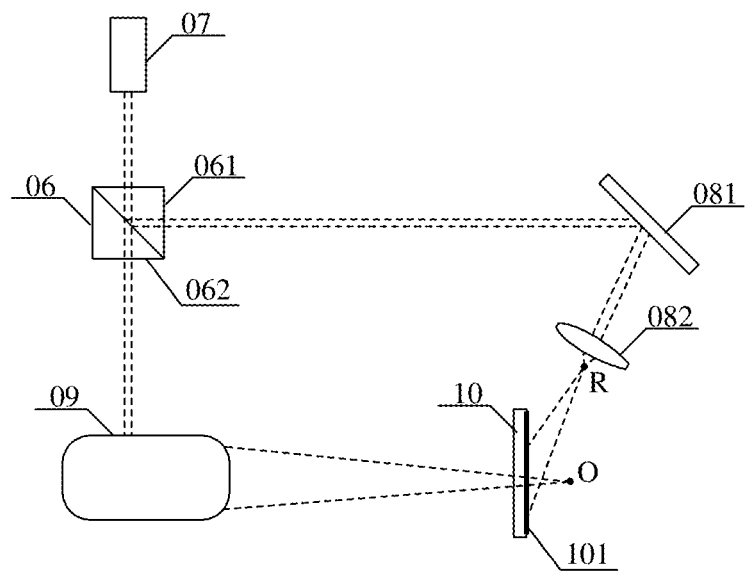
FIG. 13 is a schematic structural diagram of a second exposure device according to an embodiment of the present disclosure.

Referring to FIG. 13, the first exposure assembly 08 may include a reflector 081 and a first objective lens 082. The reflector 081 is disposed on the first light exit side 061 of the first polarization beam splitter 06. The first objective lens 082 is disposed on a light exit side of the reflector 081.

It should be noted that the reflector 081 is configured to reflect the S-polarized light reflected by the first polarization beam splitter 06 to the first objective lens 082. The first objective lens 082 is configured to cause the S-polarized light reflected by the first polarization beam splitter 06 to be incident on the first surface 101 of the holographic diffraction substrate 10. Parameters of each of the reflector 081 and the first objective lens 082 may be set based on requirements, which are not limited in the embodiments of the present disclosure.

The first objective lens 082 may first converge the S-polarized light reflected by the reflector 081 to a focus R of the first objective lens 082, and then the S-polarized light may diffuse from the focus R to the first surface 101 of the holographic diffraction substrate 10. In this way, the S-polarized light reflected by the first polarization beam splitter 06 is incident on the first surface 101 of the holographic diffraction substrate 10.

A distance between the focus R of the first objective lens 082 and a center of the first surface 101 of the holographic diffraction substrate 10 may be a first distance. An angle between an optical axis of the first objective lens 082 and the center of the first surface 101 of the holographic diffraction substrate 10 is a first angle. That is, the distance between the focus R of the first objective lens 082 and the center of the first surface 101 of the holographic diffraction substrate 10 may be the same as the distance between the center of the first scanner 011 and the center of the first holographic diffraction grating 021, or the same as the distance between the center of the second scanner 031 and the center of the second holographic diffraction grating 041. The angle between the optical axis of the first objective lens 082 and the center of the first surface 101 of the holographic diffraction substrate 10 may be the same as the angle between the first straight line and the center of the first holographic diffraction grating 021, or the same as the angle between the second straight line and the center of the second holographic diffraction grating 041.

In other words, the focus R of the first objective lens 082 may be regarded as the center of the first scanner 011 or the center of the second scanner 031, and the center of the holographic diffraction substrate 10 may be regarded as the center of the first holographic diffraction grating 021 or the center of the second holographic diffraction grating 041. In this way, the finally acquired holographic diffraction grating may be regarded as the first holographic diffraction grating 021 or the second holographic diffraction grating 041.

Figure 14:
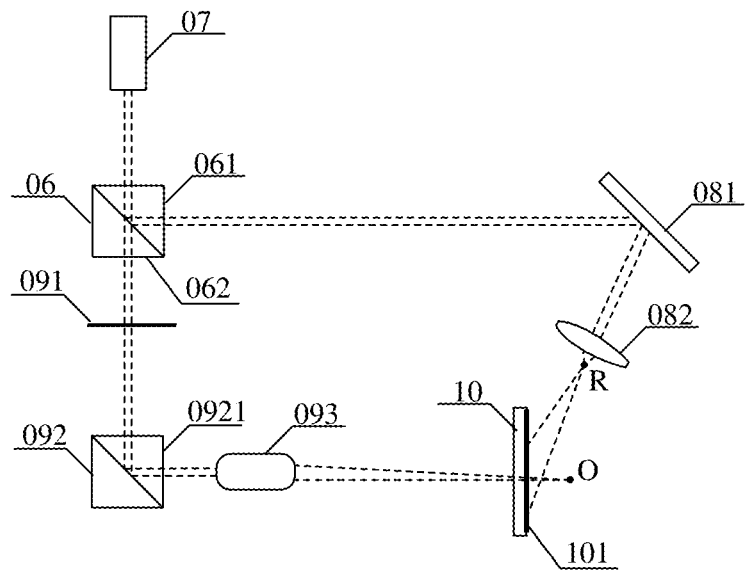
FIG. 14 is a schematic structural diagram of a third exposure device according to an embodiment of the present disclosure.

Referring to FIG. 14, the second exposure assembly 09 may include a first half-wave plate 091, a second polarization beam splitter 092, and a fifth lens group 093. The first half-wave plate 091 is disposed on the second light exit side 062 of the first polarization beam splitter 06. The second polarization beam splitter 092 is disposed on a light exit side of the first half-wave plate 091. The fifth lens group 093 is disposed on a first light exit side 0921 of the second polarization beam splitter 092.

It should be noted that the first half-wave plate 091 is an optical element configured to convert P-polarized light transmitted from the second light exit side 062 of the first polarization beam splitter 06 into S-polarized light. The second polarization beam splitter 092 is an optical element configured to transmit P-polarized light and reflect S-polarized light. The first light exit side 0921 of the second polarization beam splitter 092 is a light exit side of the S-polarized light reflected by the second polarization beam splitter 092. The fifth lens group 093 is configured to cause the S-polarized light reflected by the second polarization beam splitter 092 to be incident on the first surface 101 of the holographic diffraction substrate 10. A focus O of the fifth lens group 093 and the first surface 101 of the holographic diffraction substrate 10 are located on a same side of the holographic diffraction substrate 10.

It should be understood that during the process that the first half-wave plate 091 converts the P-polarized light transmitted from the second light exit side 062 of the first polarization beam splitter 06 into the S-polarized light, an intensity ratio of the S-polarized light and the P-polarized light may be adjusted to control intensity of the S-polarized light incident on the first surface 101 of the holographic diffraction substrate 10. The P-polarized light transmitted through the first half-wave plate 091 may be completely converted into S-polarized light. That is, a laser incident on the second polarization beam splitter 092 is all S-polarized light, and the intensity of the S-polarized light is the strongest. Alternatively, the P-polarized light transmitted through the first half-wave plate 091 may be partially converted into S-polarized light. That is, part of the laser incident on the second polarization beam splitter 092 is S-polarized light and part of the laser is P-polarized light, and intensity of the S-polarized light is weaker than the intensity of the S-polarized light in the above case. Therefore, the second polarization beam splitter 092 is disposed on the light exit side of the first half-wave plate 091 to transmit the P-polarized light in the incident laser and reflect the S-polarized light in the incident laser. In this way, laser incident on the fifth lens group 093 includes only S-polarized light but not P-polarized light, to ensure purity of the S-polarized light incident on the first surface 101 of the holographic diffraction substrate 10.

In summary, the first half-wave plate 091 may adjust the intensity of the S-polarized light projected by the second exposure assembly 09 onto the first surface 101 of the holographic diffraction substrate 10.

A distance between the focus O of the fifth lens group 093 and the center of the first surface 101 of the holographic diffraction substrate 10 is a second distance. That is, the distance between the focus O of the fifth lens group 093 and the center of the first surface 101 of the holographic diffraction substrate 10 may be the same as the distance between the second focus and the center of the first holographic diffraction grating 021, or the same as the distance between the second focus and the second holographic diffraction grating 041.

Figure 15:
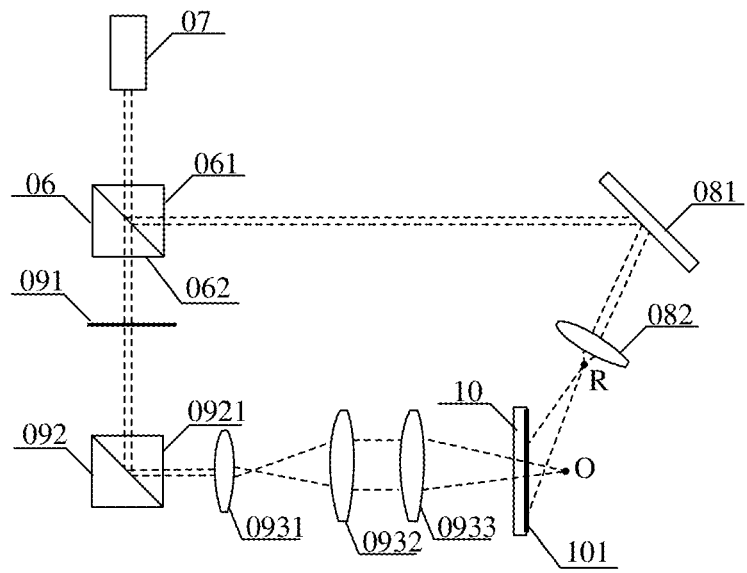
FIG. 15 is a schematic structural diagram of a fourth exposure device according to an embodiment of the present disclosure.

Referring to FIG. 15, the fifth lens group 093 may include a second objective lens 0931, a first lens 0932, and a second lens 0933. The second objective lens 0931 is disposed on the first light exit side 0921 of the second polarization beam splitter 092. The first lens 0932 and the second lens 0933 are sequentially disposed on a light exit side of the second objective lens 0931.

It should be noted that the second objective lens 0931 may converge the S-polarized light reflected by the second polarization beam splitter 092 to a focus of the second objective lens 0931, and then the S-polarized light may diffuse from the focus of the second objective lens 0931 to the first lens 0932. The first lens 0932 may collimate and reduce the incident S-polarized light, that is, reduce a spot diameter and divergence angle of the incident S-polarized light. Then, the second lens 0933 converges the incident S-polarized light to a focus of the second lens 0933, namely, the focus O of the fifth lens group 093. Because the focus O of the fifth lens group 093 and the first surface 101 of the holographic diffraction substrate 10 are located on the same side of the holographic diffraction substrate 10, the S-polarized light transmitted through the second lens 0933 interferes with the S-polarized light from the first exposure assembly 08 on the first surface 101 of the holographic diffraction substrate 10.

Figure 16:
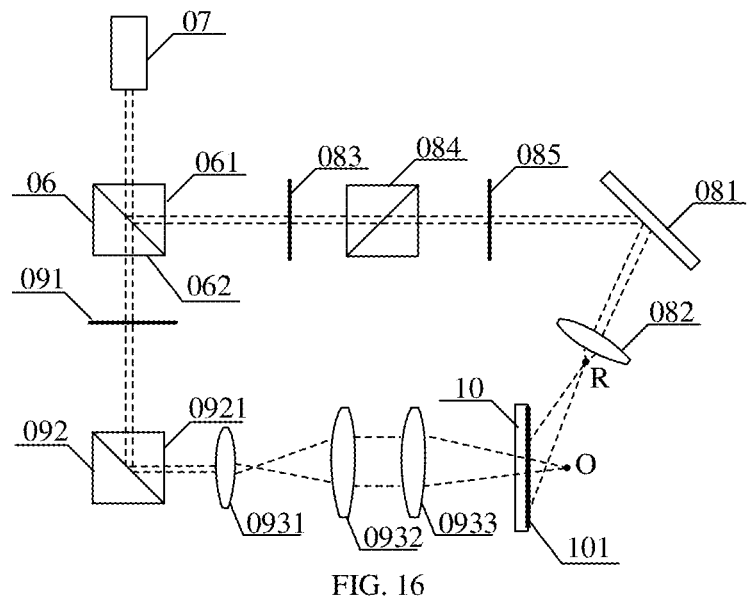
FIG. 16 is a schematic structural diagram of a fifth exposure device according to an embodiment of the present disclosure.

To adjust the intensity of the S-polarized light being incident by the first exposure assembly 08 onto the first surface 101 of the holographic diffraction substrate 10, referring to FIG. 16, the first exposure assembly 08 may further include a second half-wave plate 083, a third polarization beam splitter 084, and a third half-wave plate 085. The second half-wave plate 083 is disposed on the first light exit side 061 of the first polarization beam splitter 06. The third polarization beam splitter 084 is disposed on a light exit side of the second half-wave plate 083. The third half-wave plate 085 is disposed between a first light exit side of the third polarization beam splitter 084 and the reflector 081.

It should be noted that the second half-wave plate 083 is an optical element configured to convert the S-polarized light reflected from the first light exit side 061 of the first polarization beam splitter 06 into P-polarized light. The third polarization beam splitter 084 is an optical element configured to transmit P-polarized light and reflect S-polarized light. The first light exit side of the third polarization beam splitter 084 is a light exit side of the P-polarized light transmitted by the third polarization beam splitter 084. The third half-wave plate 085 is an optical element configured to convert the P-polarized light transmitted from the first light exit side of the third polarization beam splitter 084 into S-polarized light.

Briefly, the second half-wave plate 083 may convert all or part of the S-polarized light reflected from the first light exit side 061 of the first polarization beam splitter 06 into P-polarized light, to adjust the intensity of the S-polarized light incident on the first surface 101 of the holographic diffraction substrate 10. In the case that the second half-wave plate 083 converts part of the S-polarized light reflected from the first light exit side 061 of the first polarization beam splitter 06 into P-polarized light, that is, the laser transmitted from the second half-wave plate 083 may include S-polarized light, the third polarization beam splitter 084 disposed on the light exit side of the second half-wave plate 083 may reflect the S-polarized light and transmit the P-polarized light, such that the laser incident on the third half-wave plate 085 includes only P-polarized light. The third half-wave plate 085 may convert all the incident P-polarized light into S-polarized light, to ensure the purity of the S-polarized light incident on the first surface 101 of the holographic diffraction substrate 10.

In summary, the second half-wave plate 083 may adjust the intensity of the S-polarized light projected by the first exposure assembly 08 onto the first surface 101 of the holographic diffraction substrate 10.

Figure 17:
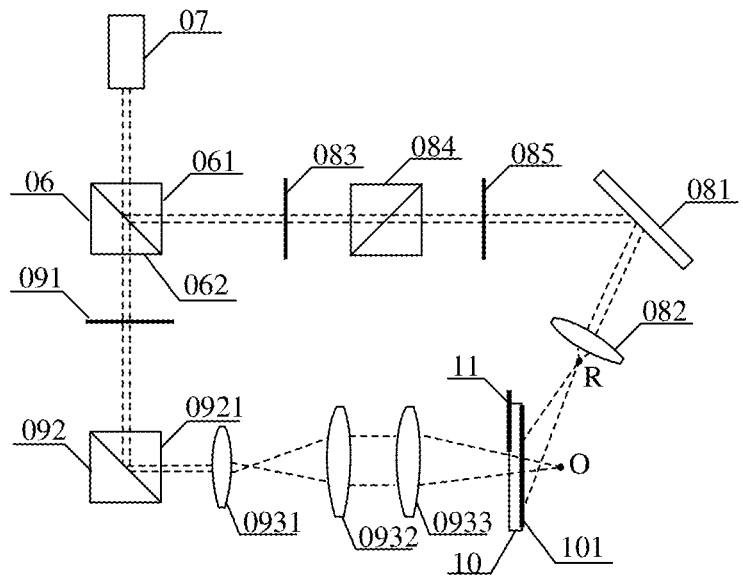
FIG. 17 is a schematic structural diagram of a sixth exposure device according to an embodiment of the present disclosure.
Figure 18:
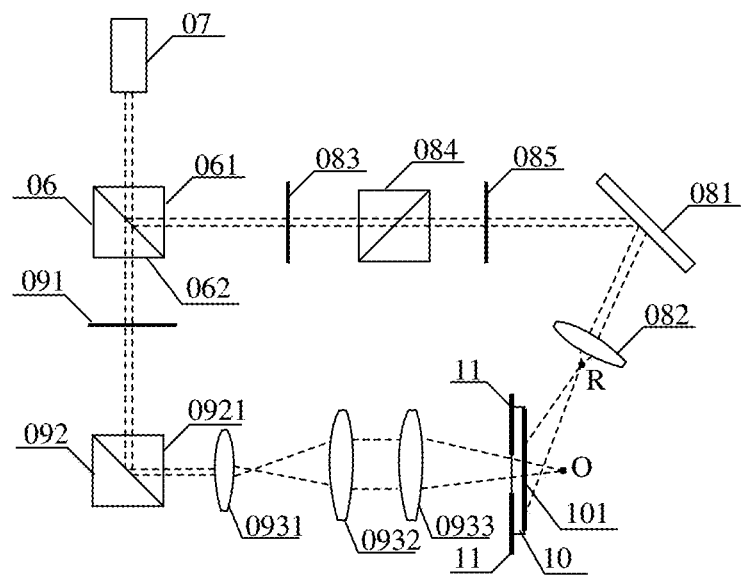
FIG. 18 is a schematic structural diagram of a seventh exposure device according to an embodiment of the present disclosure.

Referring to FIG. 17, the exposure device may further include a diaphragm 11. The diaphragm 11 is in contact with a second surface 102 of the holographic diffraction substrate 10. The diaphragm 11 is configured to adjust an exposure area of the first surface 101 of the holographic diffraction substrate 10. When the diaphragm 11 moves toward the center of the holographic diffraction substrate 10, the exposure area of the first surface 101 of the holographic diffraction substrate 10 is decreased. When the diaphragm 11 moves away from the center of the holographic diffraction substrate 10, the exposure area of the first surface 101 of the holographic diffraction substrate 10 is increased. Referring to FIG. 18, there may be two diaphragms 11. The two diaphragms 11 may be in contact with two sides of the second surface 102 of the holographic diffraction substrate 10, respectively. When the two diaphragms 11 move toward each other, the exposure area of the first surface 101 of the holographic diffraction substrate 10 is decreased. When the two diaphragms 11 move away from each other, the exposure area of the first surface 101 of the holographic diffraction substrate 10 is increased.

Figure 19:
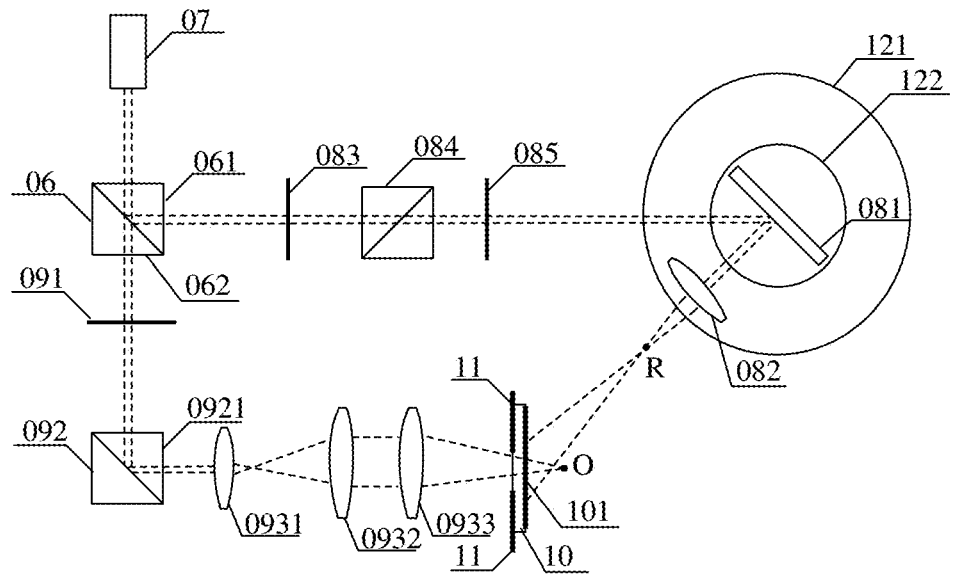
FIG. 19 is a schematic structural diagram of an eighth exposure device according to an embodiment of the present disclosure.

To adjust the angle between the optical axis of the first objective lens 082 and the center of the holographic diffraction substrate 10 more conveniently, referring to FIG. 19, the exposure device may further include a moving assembly 12. The moving assembly 12 may include a first turntable 121 and a second turntable 122. The second turntable 122 is disposed on a first surface of the first turntable 121. The reflector 081 is fixed on a first surface of the second turntable 122. A reflective surface of the reflector 081 is perpendicular to the first surface of the second turntable 122. The first objective lens 082 is fixed on the first surface of the first turntable 121.

It should be noted that the first turntable 121 and the second turntable 122 may rotate around their own axes. An area of the first turntable 121 is greater than an area of the second turntable 122, to ensure that the S-polarized light reflected from the reflector 081 may be incident on the first objective lens 082. A shape, a size, and the like of each of the first turntable 121 and the second turntable 122 may be predetermined based on requirements, which are not limited in the embodiments of the present disclosure. For example, both a shape of the first turntable 121 and a shape of the second turntable 122 may be circular.

Figure 20:
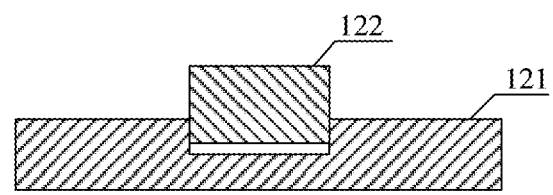
FIG. 20 is a schematic structural diagram of a first turntable and a second turntable according to an embodiment of the present disclosure.

In an example, referring to FIG. 20, there is a groove on the first surface of the first turntable 121, such that a second surface of the second turntable 122 is located in the groove. In this way, the second turntable 122 is disposed on the first surface of the first turntable 121. The second turntable 122 may be disposed on the first surface of the first turntable 121 in other ways, which is not limited in the embodiments of the present disclosure.

A third straight line may be perpendicular to the first surface of the first turntable 121 and the first surface of the second turntable 122, wherein the third straight line is a straight line on which centers of the first turntable 121 and the second turntable 122 are located. It may be understood that the first turntable 121 and the second turntable 122 may rotate around a same axis. In this way, relative positions of the reflector 081 and the first objective lens 082 may be adjusted more conveniently, and it may be ensured that the adjustment of the reflector 081 and the adjustment of the first objective lens 082 do not interfere with each other.

Figure 21:
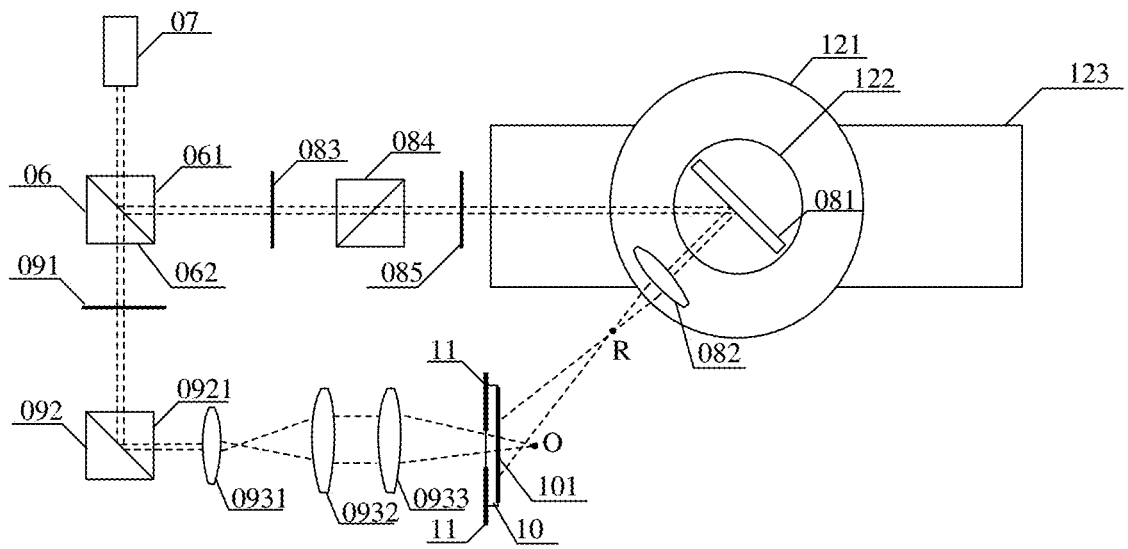
FIG. 21 is a schematic structural diagram of a ninth exposure device according to an embodiment of the present disclosure.

To adjust the angle between the optical axis of the first objective lens 082 and the center of the holographic diffraction substrate 10 more conveniently, referring to FIG. 21, at least one pulley 1211 may be mounted on a second surface of the first turntable 121, and the moving assembly 12 may further include a rail 123. The at least one pulley 1211 is disposed in the rail 123.

Figure 22:
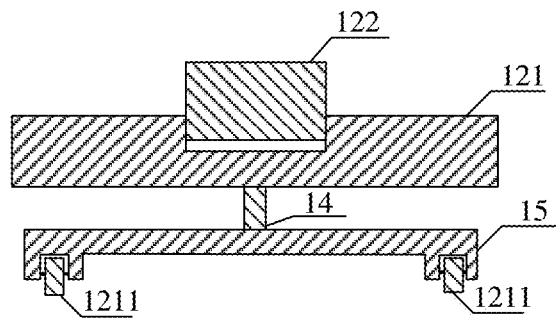
FIG. 22 is a schematic structural diagram of a first turntable, a second turntable, and pulleys according to an embodiment of the present disclosure.

In an example, to facilitate rotation of the first turntable 121 and movement of the first turntable 121 on the track 123, referring to FIG. 22, the exposure device may further include a rotating shaft 14 and a support member 15. A first end of the rotating shaft 14 is connected to the second surface of the first turntable 121. A second end of the rotating shaft 14 is connected to the support member 15. Two pulleys 1211 are mounted at two ends of the support member 15, respectively. The two pulleys 1211 may be disposed in the track 123. The first turntable 121 may rotate around the rotating shaft 14, and the first turntable 121 may also be moved on the track 123 through the two pulleys 1211. In this way, the angle between the optical axis of the first objective lens 082 and the center of the holographic diffraction substrate 10 may be adjusted.

Figure 23:
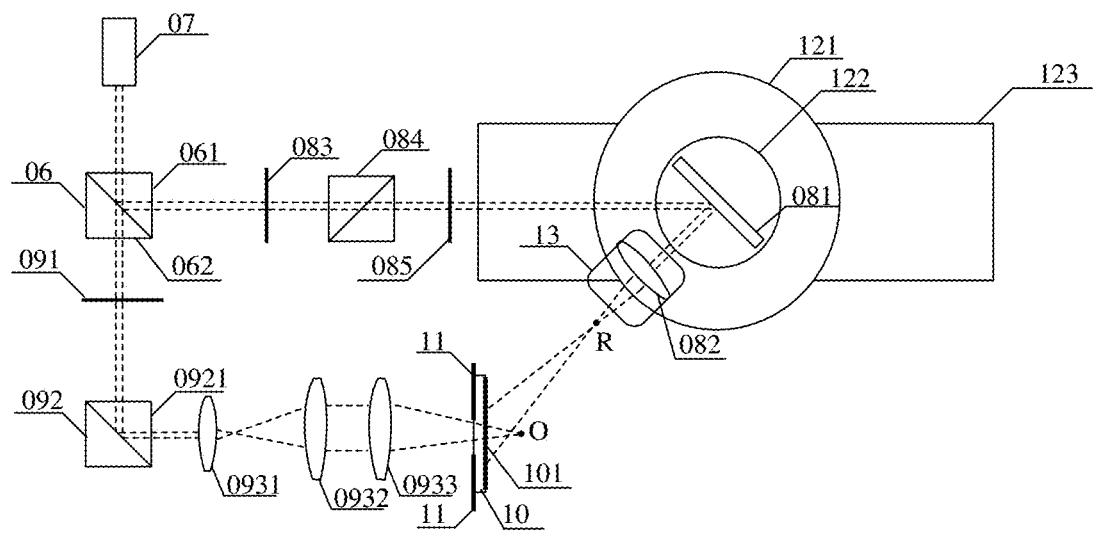
FIG. 23 is a schematic structural diagram of a tenth exposure device according to an embodiment of the present disclosure.

To adjust the distance between the focus R of the first objective lens 082 and the center of the holographic diffraction substrate 10 more conveniently, referring to FIG. 23, the exposure device may further include an objective lens housing 13. The first objective lens 082 is disposed in the objective lens housing 13. The objective lens housing 13 is fixed on the first surface of the first turntable 121.

It should be noted that the first objective lens 082 may move along its own optical axis in the objective lens housing 13. A shape, material, and the like of the objective lens housing 13 may be predetermined based on requirements, which are not limited in the embodiments of the present disclosure. For example, the objective lens housing 13 may have a cage structure.

The exposure device shown in FIG. 23 is taken as an example to describe a process of determining distances between the various optical elements in the exposure device and building the exposure device.

Figure 24:
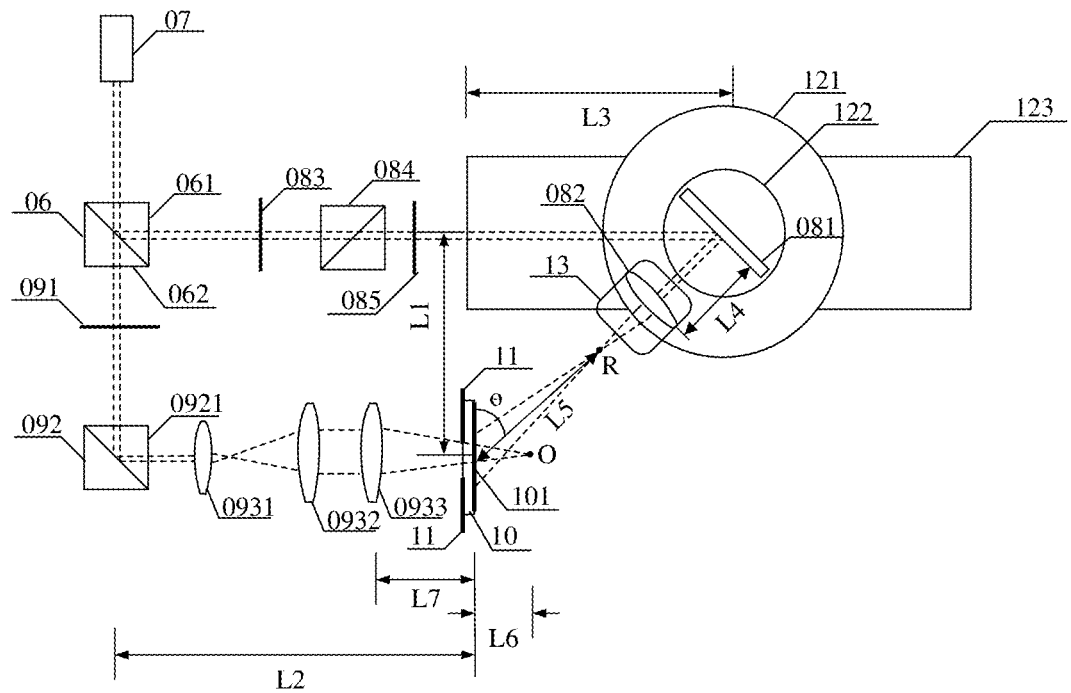
FIG. 24 is a schematic structural diagram of an eleventh exposure device according to an embodiment of the present disclosure.

In a possible case, referring to FIG. 24, an angle θ between the optical axis of the first objective lens 082 and the center of the holographic diffraction substrate 10, a distance $L_1$ between a straight line on which the S-polarized light incident on the reflector 081 is located and the center of the first surface 101 of the holographic diffraction substrate 10, a distance $L_2$ between a center of the first polarization beam splitter 06 and a plane in which the holographic diffraction substrate 10 is located, the distance $L_5$ between the focus R of the first objective lens 082 and the center of the first surface 101 of the holographic diffraction substrate 10, the distance $L_6$ between the focus O of the second lens 0933 and the center of the first surface 101 of the holographic diffraction substrate 10, a focal length $f_{b1}$ of the first objective lens 082, and a focal length $f_{b2}$ of the second lens 0933 may be first determined. Then, a distance $L_3$ between a center of the reflector 081 and the plane in which the holographic diffraction substrate 10 is located may be determined according to a formula 1.

$$L_3 = L_1 * \tan\theta \qquad \text{Formula 1:}$$

Next, a distance $L_4$ between the center of the reflector 081 and the center of the first objective lens 082 may be determined according to a formula 2.

$$L_4 = \frac{L_1}{\cos\theta} - f_{b1} - L_5 \qquad \text{Formula 2}$$

Next, a distance between a center of the second lens 0933 and the center of the first surface 101 of the holographic diffraction substrate 10 may be determined according to a formula 3.

$$L_7 = f_{b2} - L_6 \qquad \text{Formula 3:}$$

Figure 25:
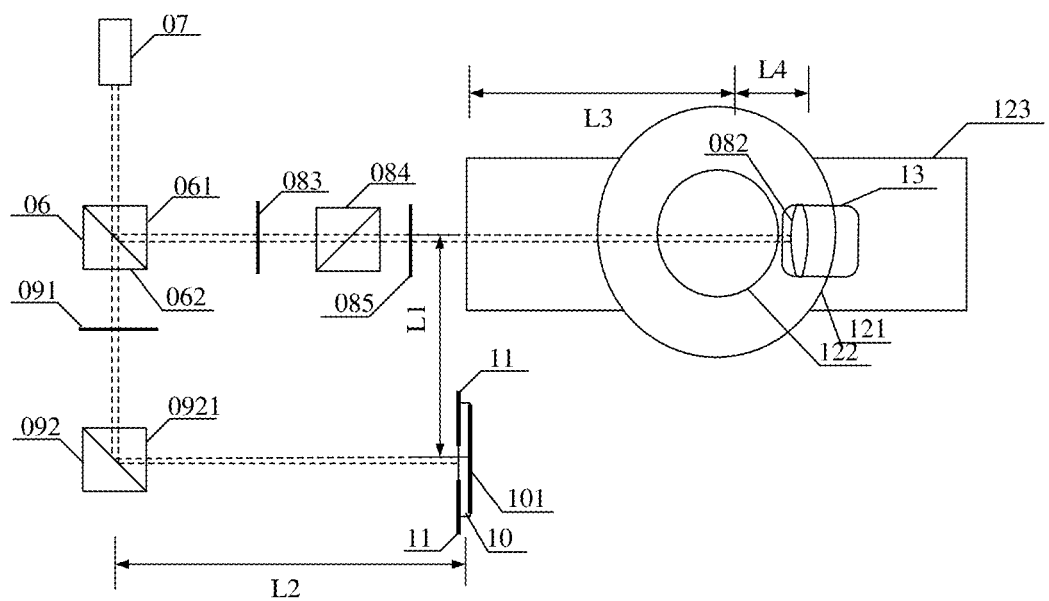
FIG. 25 is a schematic structural diagram of building an exposure device according to an embodiment of the present disclosure.
Figure 26:
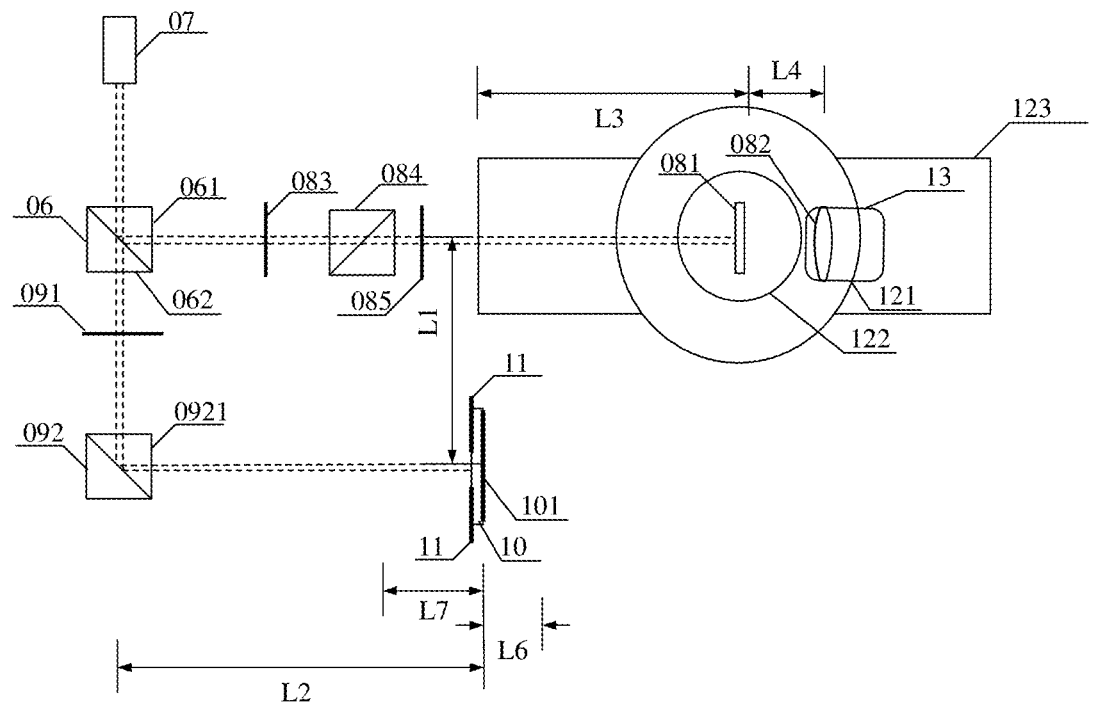
FIG. 26 is a schematic structural diagram of building an exposure device according to an embodiment of the present disclosure.
Figure 27:
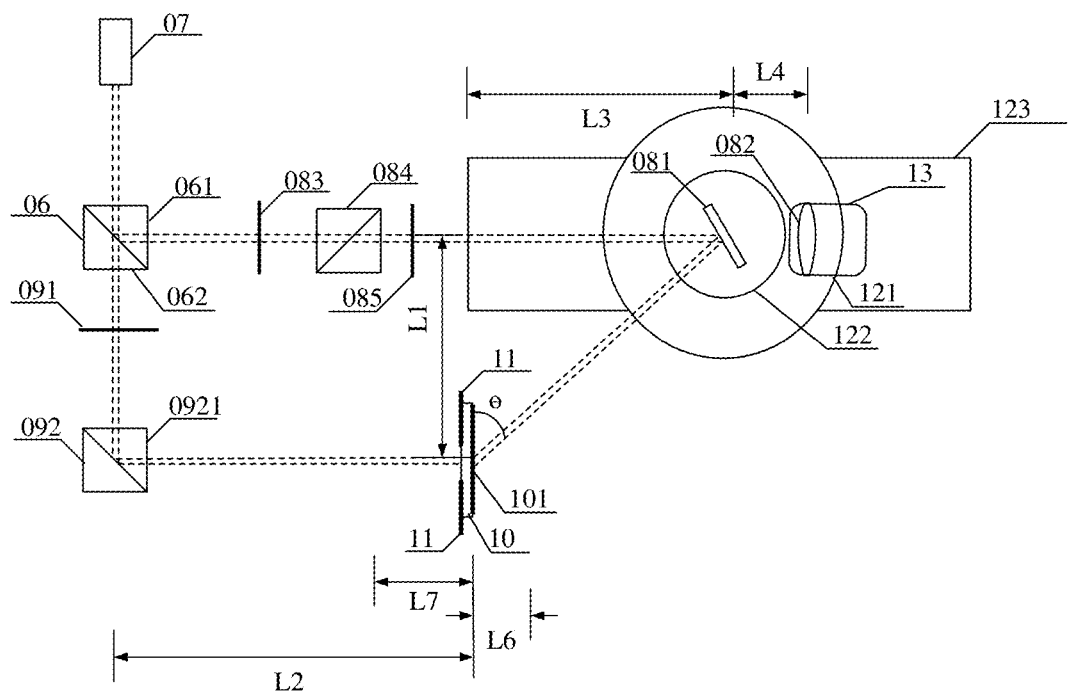
FIG. 27 is a schematic structural diagram of building an exposure device according to an embodiment of the present disclosure.
Figure 28:
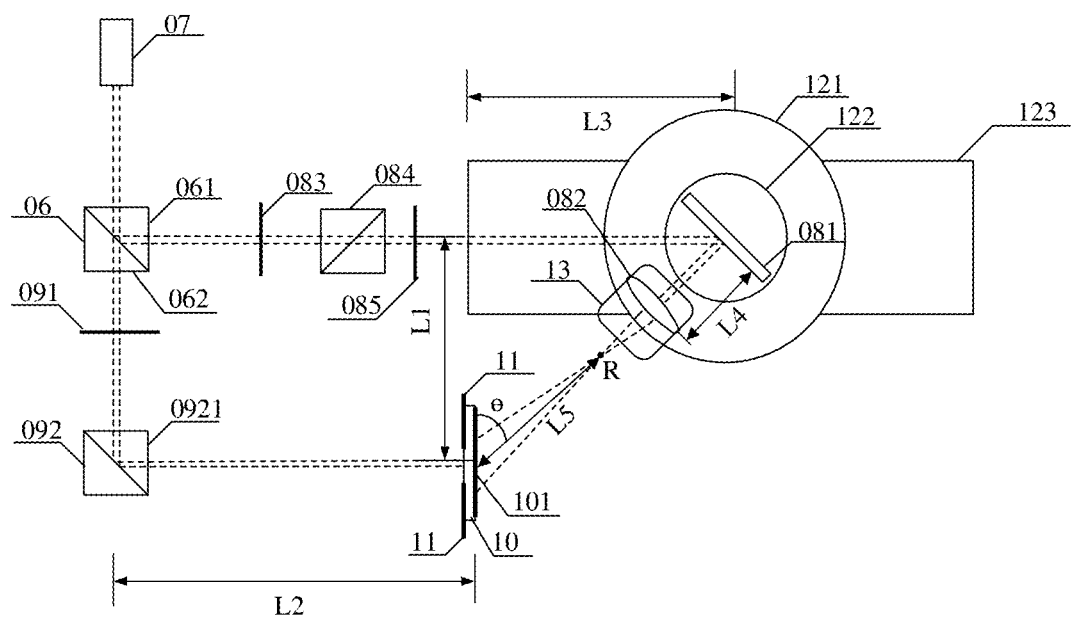
FIG. 28 is a schematic structural diagram of building an exposure device according to an embodiment of the present disclosure.

Specifically, when the exposure device is built, the holographic diffraction substrate 10 may not be coated with the photosensitive film, to prevent impact of external light on an effect of the photosensitive film. Then, referring to FIG. 25, the first objective lens 082 may be fixed on the first surface of the first turntable 121 based on $L_1$, $L_2$, $L_3$, and $L_4$, such that the optical axis of the first objective lens 082 and the S-polarized light projected by the first exposure assembly 08 are located on a same straight line. In this case, the second exposure assembly 09 includes the first half-wave plate 091 and the second polarization beam splitter 092. The S-polarized light reflected by the second polarization beam splitter 092 may be directly incident on the holographic diffraction substrate 10, and a spot is formed at the center of the holographic diffraction substrate 10. Then, referring to FIG. 26, the reflector 081 is fixed on the first surface of the second turntable 122, such that a plane in which the reflector 081 is located is perpendicular to the S-polarized light projected by the first exposure assembly 08, and the S-polarized light projected by the first exposure assembly 08 may be perpendicularly projected to the center of the reflector 081. Then, referring to FIG. 27, the second turntable 122 is counterclockwise rotated (90−θ)/2 degrees, such that the S-polarized light reflected by the reflector 081 may be incident on the center of the holographic diffraction substrate 10, and a position of its spot coincides with the position of the spot of the S-polarized light reflected by the second polarization beam splitter 092. In this case, according to the principle that a sum of the inner angles of a triangle is 180 degrees, it may be determined that an angle between the straight line on which the S-polarized light reflected by the reflector 081 is located and the first surface 101 of the holographic diffraction substrate 10 is θ. Then, referring to FIG. 28, the first turntable 121 is clockwise rotated 90+θ degrees, such that the optical axis of the first objective lens 082 and the S-polarized light reflected by the reflector 081 are located on a same straight line, and the distance between the focus R of the first objective lens 082 and the center of the first surface 101 of the holographic diffraction substrate 10 is $L_5$. Finally, the second objective lens 0931, the first lens 0932, and the second lens 0933 are disposed between the second polarization beam splitter 092 and the holographic diffraction substrate 10. The positions of these three elements are adjusted to cause a distance between the center of the second lens 0933 and the center of the first surface 101 of the holographic diffraction substrate 10 to be $L_7$ and the distance between the focus O of the second lens 0933 and the center of the first surface 101 of the holographic diffraction substrate to be $L_6$. The exposure device shown in FIG. 23 is acquired.

In the embodiments of the present disclosure, the exposure device for preparing a holographic diffraction grating includes the first polarization beam splitter 06, the third laser 07, the first exposure assembly 08, the second exposure assembly 09, and the holographic diffraction substrate 10. The first polarization beam splitter 06 is disposed on the light exit side of the third laser 07. The first polarization beam splitter 06 is configured to transmit P-polarized light and reflect S-polarized light. The first exposure assembly 08 is disposed on the first light exit side 061 of the first polarization beam splitter 06. The second exposure assembly 09 is disposed on the second light exit side 062 of the first polarization beam splitter 06. The first surface 101 of the holographic diffraction substrate 10 is coated with the photosensitive film. Because the holographic diffraction substrate 10 is disposed in the overlapping area of the light exit sides of the first exposure assembly 08 and the second exposure assembly 09, in the case that the first exposure assembly 08 and the second exposure assembly 09 may simultaneously project the S-polarized light onto the first surface 101 of the holographic diffraction substrate 10, the S-polarized light on different optical paths may interfere on the first surface 101 of the holographic diffraction substrate 10, and the information such as the wavelength, amplitude, and phase of the laser projected by the third laser 07 may be recorded on the photosensitive film on the first surface 101 of the holographic diffraction substrate 10, to acquire the holographic diffraction grating. Composition of the exposure device is simple, and a process of acquiring the holographic diffraction grating is simple and efficient.

The above embodiments are merely optional embodiments of the present disclosure and are not intended to limit the present disclosure. Any modification, equivalent replacement, and improvement within the spirit and principle of the present disclosure shall be included within the protection scope of the present disclosure.

What is claimed is:

1. An augmented reality (AR) device, comprising a first projection assembly and a first display assembly; wherein
    the first display assembly is disposed on a light exit side of the first projection assembly;
    the first projection assembly comprises a first scanner, a first laser, and a first lens group, wherein the first scanner is disposed on a light exit side of the first laser, and the first scanner is configured to reflect laser beams projected by the first laser and corresponding to all pixels of a three-dimensional image one by one through rotating mechanical movement to a first holographic diffraction grating, and the first lens group is disposed on a light incident side and/or a light exit side of the first scanner; and
    the first display assembly comprises the first holographic diffraction grating and a first lens, wherein the first holographic diffraction grating is disposed on a surface, facing towards the first scanner, of the first lens and is configured to further reflect the laser beams reflected by the first scanner, so that a user of the AR device is capable of perceiving the reproduced three-dimensional image by using the first projection assembly and the first display assembly and at the same time to observe a real world scene by using the first lens, and the first lens group comprises at least one first spherical lens and/or at least one first aspheric lens.

2. The AR device according to claim 1, wherein the first projection assembly further comprises a second lens group; wherein
    in the case that the first lens group is disposed on the light incident side of the first scanner, the second lens group is disposed on the light exit side of the first scanner or between the first lens group and the first scanner, and the second lens group comprises at least one second spherical lens and/or at least one second aspheric lens; and
    in the case that the first lens group is disposed on the light exit side of the first scanner, the second lens group is disposed on a light exit side of the first lens group.

3. The AR device according to claim 1, wherein a distance between a center of the first scanner and a center of the first holographic diffraction grating is a first distance, a light incidence angle of the first holographic diffraction grating is a first angle, and a distance between the center of the first holographic diffraction grating and a first focus is a second distance, wherein the first focus is a convergence point to which a laser beam corresponding to each pixel and incident on the first holographic diffraction grating is reflected.

4. The AR device according to claim 1, further comprising a second projection assembly and a second display assembly, wherein the second display assembly is disposed on a light exit side of the second projection assembly;

the second projection assembly comprises a second scanner, a second laser, and a third lens group, wherein the second scanner is disposed on a light exit side of the second laser, and the third lens group is disposed on a light incident side and/or a light exit side of the second scanner; and the second display assembly comprises a second holographic diffraction grating and a second lens, wherein the second holographic diffraction grating is disposed on the second lens, and the third lens group comprises at least one first spherical lens and/or at least one first aspheric lens.

5. The AR device according to claim 4, wherein a distance between a center of the second scanner and a center of the second holographic diffraction grating is a first distance, a light incidence angle of the second holographic diffraction grating is a first angle, and a distance between the center of the second holographic diffraction grating and a second focus is a second distance, wherein the second focus is a convergence point to which a laser beam corresponding to each pixel and incident on the second holographic diffraction grating is reflected.

6. The AR device according to claim 4, wherein the first projection assembly and the second projection assembly are symmetrically distributed, the first display assembly and the second display assembly are symmetrically distributed, the first projection assembly and the first display assembly are disposed on one side of a center of symmetry, and the second projection assembly and the second display assembly are disposed on the other side of the center of symmetry.

7. The AR device according to claim 1, wherein the second projection assembly further comprises a fourth lens group; wherein in the case that the third lens group is disposed on the light incident side of the second scanner, the fourth lens group is disposed on the light exit side of the second scanner or between the third lens group and the second scanner, and the fourth lens group comprises at least one second spherical lens and/or at least one second aspheric lens; and in the case that the third lens group is disposed on the light exit side of the second scanner, the fourth lens group is disposed on a light exit side of the third lens group.

8. The AR device according to claim 1, wherein the AR device has at least one of the following features:

the AR device further comprises a fixing assembly, wherein the first projection assembly and the first display assembly are fixed on the fixing assembly; or the AR device is AR glasses or an AR helmet.

\* \* \* \* \*